United States Patent
Kawasaki et al.

(10) Patent No.: US 11,576,219 B2
(45) Date of Patent: Feb. 7, 2023

(54) USER EQUIPMENT, CONTROL APPARATUS, AND COMMUNICATION CONTROL METHOD

(71) Applicants: SHARP KABUSHIKI KAISHA, Sakai (JP); FG Innovation Company Limited, Tuen Mun (HK)

(72) Inventors: Yudai Kawasaki, Sakai (JP); Masafumi Aramoto, Sakai (JP)

(73) Assignees: SHARP KABUSHIKI KAISHA, Sakai (JP); FG Innovation Company Limited, New Territories (HK)

( * ) Notice: Subject to any disclaimer, the term of this patent is extended or adjusted under 35 U.S.C. 154(b) by 0 days.

(21) Appl. No.: 17/056,672

(22) PCT Filed: May 9, 2019

(86) PCT No.: PCT/JP2019/018509
§ 371 (c)(1),
(2) Date: Nov. 18, 2020

(87) PCT Pub. No.: WO2019/225326
PCT Pub. Date: Nov. 28, 2019

(65) Prior Publication Data
US 2021/0227597 A1  Jul. 22, 2021

(30) Foreign Application Priority Data
May 21, 2018  (JP) .............................. JP2018-097127

(51) Int. Cl.
*H04W 76/11* (2018.01)
*H04W 76/25* (2018.01)
*H04W 76/18* (2018.01)

(52) U.S. Cl.
CPC ............ *H04W 76/11* (2018.02); *H04W 76/18* (2018.02); *H04W 76/25* (2018.02)

(58) Field of Classification Search
CPC ..... H04W 76/11; H04W 76/12; H04W 76/18; H04W 76/25; H04W 8/06; H04W 8/22
See application file for complete search history.

(56) References Cited

U.S. PATENT DOCUMENTS

2018/0367288 A1* 12/2018 Vrzic ................ H04W 36/0069
2019/0098624 A1*  3/2019 Vaidya .............. H04W 72/0433
(Continued)

FOREIGN PATENT DOCUMENTS

| JP | 2010-512702 A | 4/2010 |
| JP | 2013-503553 A | 1/2013 |
| WO | 2018/066234 A1 | 4/2018 |

OTHER PUBLICATIONS

3GPP TS 23.501 V15.1.0 (Mar. 2018); 3rd Generation Partnership Project; Technical Specification Group Services and System Aspects; System Architecture for the 5G System; Stage 2 (Release 15).
(Continued)

*Primary Examiner* — Kashif Siddiqui
(74) *Attorney, Agent, or Firm* — ScienBiziP, P.C.

(57) ABSTRACT

Provided is a communication unit for implementing functions for URLLC that requires communication of high reliability and/or low latency in the 5GS. Provided is a communication unit for enabling functions for URLLC even in the 5GS that supports a network-initiated configuration update procedure and multiple types of session and service continuity. Further, provided is a communication unit for, in a case that multiple types of functions for URLLC are possible, sharing which function out of the functions for URLLC is available and appropriately managing shared information between a user equipment and a network.

4 Claims, 7 Drawing Sheets

(56) References Cited

U.S. PATENT DOCUMENTS

2019/0207778 A1\* 7/2019 Qiao .................... H04M 15/61
2019/0356601 A1\* 11/2019 Kweon ................... H04L 1/08
2020/0015116 A1\* 1/2020 Huang ................. H04W 28/12
2020/0053615 A1 2/2020 Chiba et al.

OTHER PUBLICATIONS

3GPP TS 23.502 V15.1.0 (Mar. 2018); 3rd Generation Partnership Project; Technical Specification Group Services and System Aspects; Procedures for the 5G System; Stage 2 (Release 15).
3GPP TR 23.725 V0.1.0 (Apr. 2018); 3rd Generation Partnership Project; Technical Specification Group Services and System Aspects; Study on enhancement of URLLC supporting in 5GC (Release 16).

\* cited by examiner

USER EQUIPMENT, CONTROL APPARATUS, AND COMMUNICATION CONTROL METHOD

TECHNICAL FIELD

The present invention relates to a user equipment, a control apparatus, and a communication control method. This application claims priority based on JP 2018-97127 filed on May 21, 2018, the contents of which are incorporated herein by reference.

BACKGROUND ART

In the 3rd Generation Partnership Project (3GPP), the study of the system architecture of the fifth generation (5G) System (5GS), which is the mobile communication systems of the next generations, specifically 5G, has been started, and support of new procedures and new functions has been discussed (see NPL 1 and NPL 2). Further, discussion in order to support Ultra-Reliable and Low Latency Communications (URLLC) that requires communication of high reliability and/or low latency in the 5GS has also been started (see NPL 3).

CITATION LIST

Non Patent Literature

NPL 1: 3GPP TS 23.501 v15.1.0 (2018-03); Technical Specification Group Services and System Aspects; System Architecture for the 5G System; Stage 2 (Release 15)
NPL 2: 3GPP TS 23.502 v15.1.0 (2018-03); Technical Specification Group Services and System Aspects; Procedures for the 5G System; Stage 2 (Release 15)
NPL 3: 3GPP TR 23.725 v0.1.0 (2018-04); Technical Specification Group Services and System Aspects; Study on Study on enhancement of URLLC supporting in 5GC (Release 16)

SUMMARY OF INVENTION

Technical Problem

In the 5G System (5GS), in order to provide various services, a 5G Core Network (5GC) being a new core network has been studied. Further, the study of functions for URLLC have also been started.

Note that, in the 5GS, new procedures such as a network-initiated configuration update procedure and new functions such as multiple types of session and service continuity and connection to a Local Area Data Network (LADN) are supported. However, in a case that the functions for URLLC are implemented in the 5GS, how such new procedures and new functions are used to be implemented in the 5GS has not been made clear yet.

One aspect of the present invention is made in the light of the circumstances as described above, and has an object to provide a method of implementing functions for URLLC in the 5GS.

Solution to Problem

A user equipment according to one embodiment of the present invention includes a controller and a transmission and/or reception unit. In a registration procedure, the transmission and/or reception unit transmits a registration request message including information indicating support of Ultra-Reliable and Low Latency Communications (URLLC) to a control apparatus, and receives the registration request message including the information indicating the support of the URLLC from the control apparatus. In a Protocol Data Unit (PDU) session establishment procedure performed after completion of the registration procedure, the controller establishes a PDU session supporting the URLLC.

A control apparatus according to one embodiment of the present invention includes a controller and a transmission and/or reception unit. In a registration procedure, the transmission and/or reception unit receives a registration request message including information indicating support of Ultra-Reliable and Low Latency Communications (URLLC) from a user equipment, and transmits the registration request message including the information indicating the support of the URLLC to the user equipment. In a Protocol Data Unit (PDU) session establishment procedure performed after completion of the registration procedure, the controller establishes a PDU session supporting the URLLC.

A communication control method for a user equipment according to one embodiment of the present invention includes the steps of: in a registration procedure, transmitting a registration request message including information indicating support of Ultra-Reliable and Low Latency Communications (URLLC) to a control apparatus, and receiving the registration request message including the information indicating the support of the URLLC from the control apparatus; and in a Protocol Data Unit (PDU) session establishment procedure performed after completion of the registration procedure, establishing a PDU session supporting the URLLC.

A communication control method for a control apparatus according to one embodiment of the present invention includes the steps of: in a registration procedure, receiving a registration request message including information indicating support of Ultra-Reliable and Low Latency Communications (URLLC) from a user equipment, and transmitting the registration request message including the information indicating the support of the URLLC to the user equipment; and in a Protocol Data Unit (PDU) session establishment procedure performed after completion of the registration procedure, establishing a PDU session supporting the URLLC.

Advantageous Effects of Invention

According to one aspect of the present invention, even in a case that the 5GS supports a network-initiated configuration update procedure and multiple types of session and service continuity, the functions for URLLC can be used in the 5GS.

DESCRIPTION OF EMBODIMENTS

Preferred embodiments for carrying out the present invention will be described with reference to the drawings.

1. Overview of System

Figure 1:
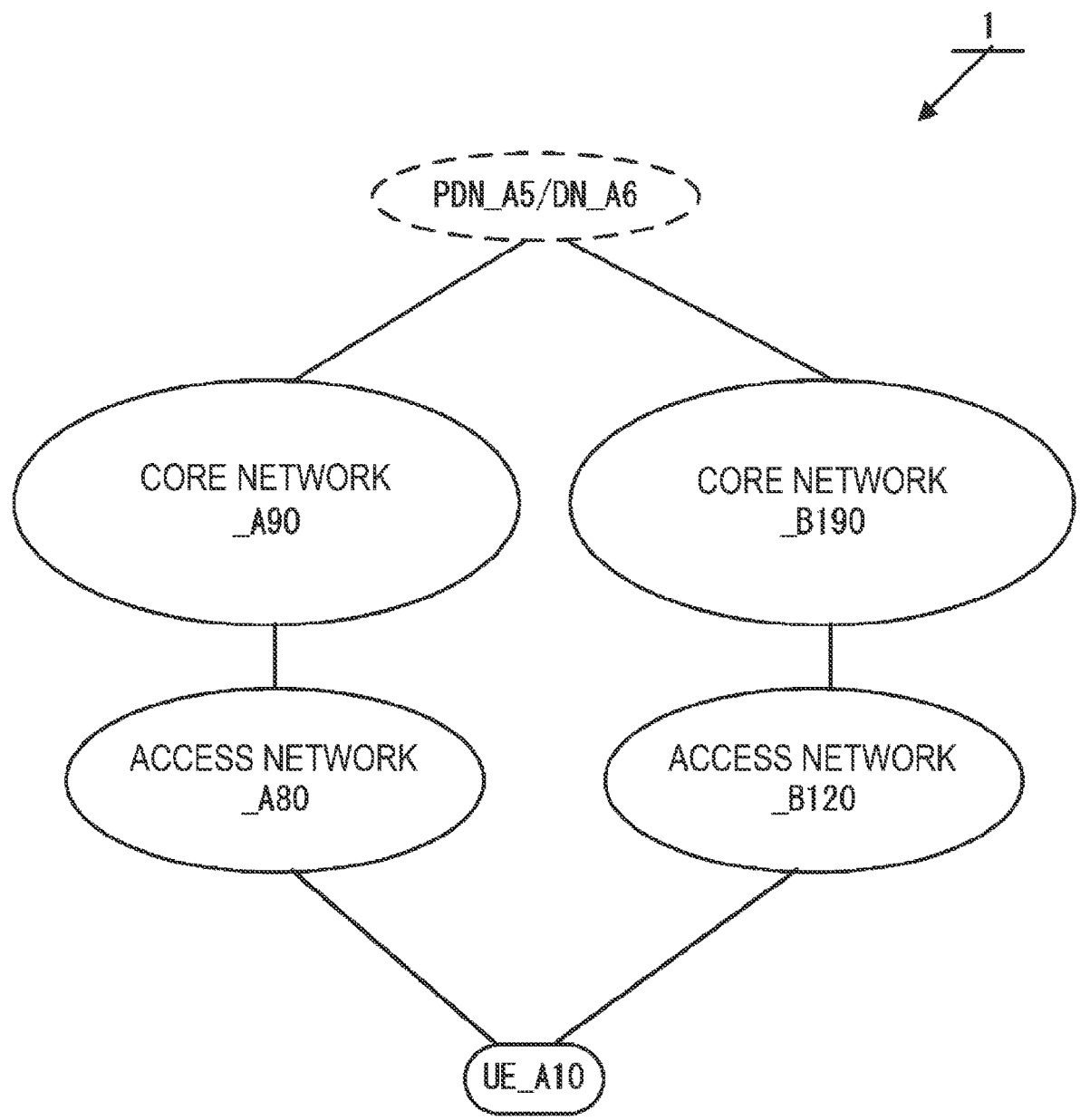
FIG. 1 is a diagram illustrating an overview of a mobile communication system (EPS/5GS).
Figure 2:
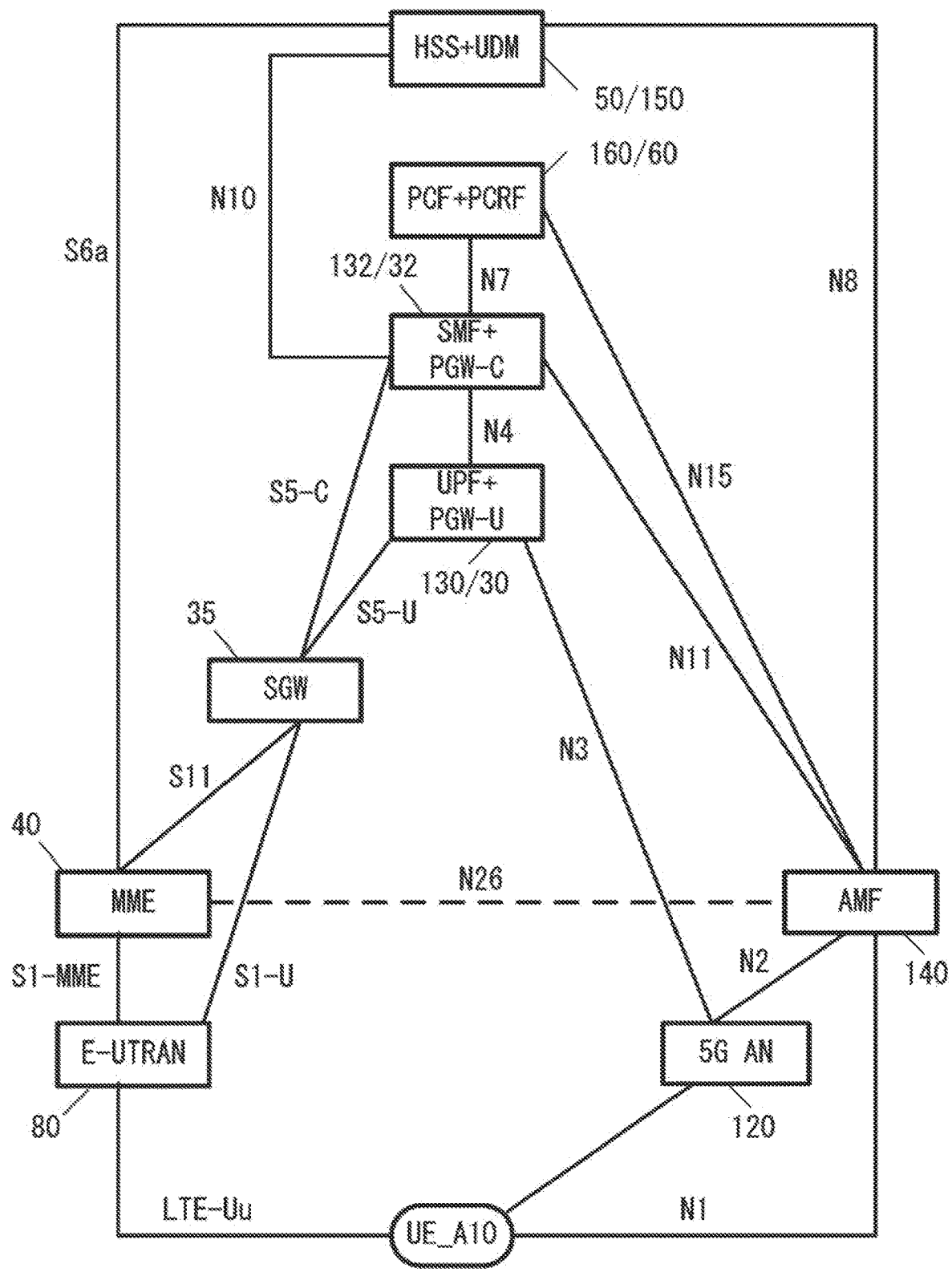
FIG. 2 is a diagram illustrating a detailed configuration of the mobile communication system (EPS/5GS).

First, FIG. 1 is a diagram illustrating an overview of a mobile communication system 1 used in each embodiment, and FIG. 2 is a diagram illustrating a detailed configuration of the mobile communication system 1.

In FIG. 1, there is illustration that the mobile communication system 1 includes a UE_A 10, an access network_A 80, a core network_A 90, a Packet Data Network (PDN)_A 5, an access network_B 120, a core network_B 190, and a Data Network (DN)_A 6.

In the following, the symbols of these apparatuses and functions may be omitted in description, such as "UE", "access network_A", "core network_A", "PDN", "access network_B", "core network_B", and "DN".

Further, FIG. 2 illustrates apparatuses and functions such as a UE_A 10, an E-UTRAN 80, an MME 40, an SGW 35, a PGW-U 30, a PGW-C 32, a PCRF 60, an HSS 50, a 5G AN 120, an AMF 140, a UPF 130, an SMF 132, a PCF 160, and a UDM 150, and interfaces for connecting these apparatuses and functions to each other.

In the following, the symbols of these apparatuses and functions may be omitted in description, such as "UE", "E-UTRAN", "MME", "SGW", "PGW-U", "PGW-C", "PCRF", "HSS", "5G AN", "AMF", "UPF", "SMF", "PCF", and "UDM".

Note that, although an Evolved Packet System (EPS) being a 4G system includes the access network_A and the core network_A, the EPS may further include a UE and/or a PDN. Further, although a 5G System (5GS) being a 5G system includes the UE, the access network_B, and the core network_B, the 5GS may further include a DN.

The UE is an apparatus capable of connecting to a network service via 3GPP access (also referred to as a 3GPP access network or a 3GPP AN) and/or non-3GPP access (also referred to as a non-3GPP access network or a non-3GPP AN). The UE may be a terminal apparatus capable of radio communication, such as a mobile phone and a smartphone, and may be a terminal apparatus that can be connected to both of the EPS and the 5GS. The UE may also include a Universal Integrated Circuit Card (UICC) and an Embedded UICC (eUICC). Note that the UE may be expressed as a user equipment, or may be expressed as a terminal apparatus.

Further, the access network_A corresponds to an Evolved Universal Terrestrial Radio Access Network (E-UTRAN) and/or a wireless LAN access network. In the E-UTRAN, one or more evolved Node Bs (eNBs) 45 are deployed. Note that, in the following, the symbols of the eNB 45 may be omitted in description, such as "eNB". Further, in a case that multiple eNBs are present, each of the eNBs is connected to each other via the X2 interface, for example. Further, in the wireless LAN access network, one or more access points are deployed.

Further, the access network_B corresponds to a 5G access network (5G AN). The 5G AN includes an NG Radio Access Network (NG-RAN) and/or a non-3GPP access network. In the NG-RAN, one or more NR NodeBs (gNBs) 122 are deployed. Note that, in the following, the symbols of the gNB 122 may be omitted in description, such as "eNB". The gNB is a node that provides a New Radio (NR) user plane and a control plane for the UE, and is a node that is connected to the 5GC via the NG interface (including the N2 interface or the N3 interface). In other words, the gNB is a base station apparatus that is newly designed for the 5GS, and has a function different from that of the base station apparatus (eNB) used in the EPS being the 4G system. Further, in a case that multiple gNBs are present, each of the gNBs is connected to each other via the Xn interface, for example.

Further, in the following, the E-UTRAN and the NG-RAN may be referred to as 3GPP access. Further, the wireless LAN access network and the non-3GPP AN may be referred to as non-3GPP access. Further, nodes deployed in the access network_B may also be collectively referred to as an NG-RAN node.

Further, in the following, the access network_A, and/or the access network_B, and/or an apparatus included in the access network_A, and/or an apparatus included in the access network_B may be referred to as an access network or an access network apparatus.

Further, the core network_A corresponds to an Evolved Packet Core (EPC). In the EPC, for example, a Mobility Management Entity (MME), a Serving Gateway (SGW), a Packet Data Network Gateway (PGW)-U, a PGW-C, a Policy and Charging Rules Function (PCRF), a Home Subscriber Server (HSS), and the like are deployed.

Further, the core network_B corresponds to a 5G Core Network (5GC). In the 5GC, for example, an Access and Mobility Management Function (AMF), a User Plane Function (UPF), a Session Management Function (SMF), a Policy Control Function (PCF), a Unified Data Management (UDM), and the like are deployed. Here, the 5GC may be expressed as a 5G Core Network (5GCN).

Further, in the following, the core network_A, and/or the core network_B, an apparatus included in the core network_A, and/or an apparatus included in the core network_B may be referred to as a core network or a core network apparatus.

The core network (the core network_A and/or the core network_B) may be an IP mobile communication network that is operated by a mobile communication operator (Mobile Network Operator (MNO)) connecting the access network (the access network_A and/or the access network_B) and the PDN and/or the DN, may be a core network for a mobile communication operator that operates and manages the mobile communication system 1, or may be a core network for a virtual mobile communication operator and a virtual mobile communication service provider such as a Mobile Virtual Network Operator (MVNO) and a Mobile Virtual Network Enabler (MVNE).

Further, although FIG. 1 illustrates a case that the PDN and the DN are the same, the PDN and the DN may be different. The PDN may be a Data Network (DN) to provide a communication service to the UE. Note that the DN may be configured as a packet data service network, or configured for each service. Furthermore, the PDN may include a connected communication terminal. Therefore, connecting with the PDN may be connecting with the communication terminal or a server device located in the PDN. Furthermore, the transmission and/or reception of the user data to and/or from the PDN may be transmission and/or reception of the user data to and/or from the communication terminal or the server device located in the PDN. Note that the PDN may be represented by the DN, or the DN may be represented by the PDN.

Further, in the following, at least a part of the access network_A, the core network_A, the PDN, the access network_B, the core network_B, and the DN, and/or one or more apparatuses included in these may be referred to as a network or a network apparatus. In other words, the expression "the network and/or the network apparatus transmits and/or receives a message and/or performs a procedure" signifies that "at least a part of the access network_A, the core network_A, the PDN, the access network_B, the core network_B, and the DN and/or one or more apparatuses included in these transmit and/or receive a message and/or perform a procedure".

Further, the UE can connect to the access network. Further, the UE is capable of connecting to the core network via the access network. Further, the UE is capable of connecting to the PDN or the DN via the access network and the core network. In other words, the UE is capable of transmitting and/or receiving (communicating) the user data to and/or from the PDN or the DN. In a case of transmission and/or reception of the user data, not only Internet Protocol (IP) communication but also non-IP communication may be used.

Here, the IP communication refers to data communication using the IP, and transmission and/or reception of data is performed by using IP packets. The IP packets includes an IP header and a payload part. The payload part may include data transmitted and/or received by the apparatuses and the functions included in the EPS and the apparatuses and the functions included in the 5GS. Further, the non-IP communication refers to data communication not using the IP, and transmission and/or reception of data is performed in a format different from that of a structure of the IP packets. For example, the non-IP communication may be the data communication achieved through transmitting and/or receiving application data not given the IP header, or may transmit and/or receive the user data transmitted and/or received by the UE to which another header such as a MAC header and an Ethernet (trade name) frame header is given.

2. Configuration of Each Apparatus

Next, a configuration of each apparatus (the UE, and/or the access network apparatus, and/or the core network apparatus) used in each embodiment will be described with reference to the drawings. Note that each apparatus may be configured as physical hardware, may be configured as logical (virtual) hardware that is configured on general-purpose hardware, or may be configured as software. Further, at least a part (including all) of the functions of each apparatus may be configured as the physical hardware, the logical hardware, or the software.

Note that each storage unit (a storage unit_A 340, a storage unit_A 440, a storage unit_B 540, a storage unit_A 640, or a storage unit_B 740) in each apparatus and function described in the following includes, for example, a semiconductor memory, a Solid State Drive (SSD), a Hard Disk Drive (HDD), or the like. Further, each storage unit can not only store pieces of information that are originally configured at the shipping stage but can also store various pieces of information that are transmitted and/or received to and/or from an apparatus and a function (e.g., the UE, and/or the access network apparatus, and/or the core network apparatus, and/or the PDN, and/or the DN) other than its own apparatus and function. Further, each storage unit can store identification information, control information, a flag, a parameter, and the like included in a control message which is transmitted and/or received in various communication procedures described below. Further, each storage unit may store these pieces of information for each UE. Further, in a case that interworking is performed between the 5GS and the EPS, each storage unit can store a control message and user data transmitted and/or received to and/or from the apparatus and the function included in the 5GS and/or the EPS. In this case, each storage unit can not only store what is transmitted and/or received via the N26 interface but can also store what is transmitted and/or received without using the N26 interface.

2.1. Apparatus Configuration of UE

Figure 3:
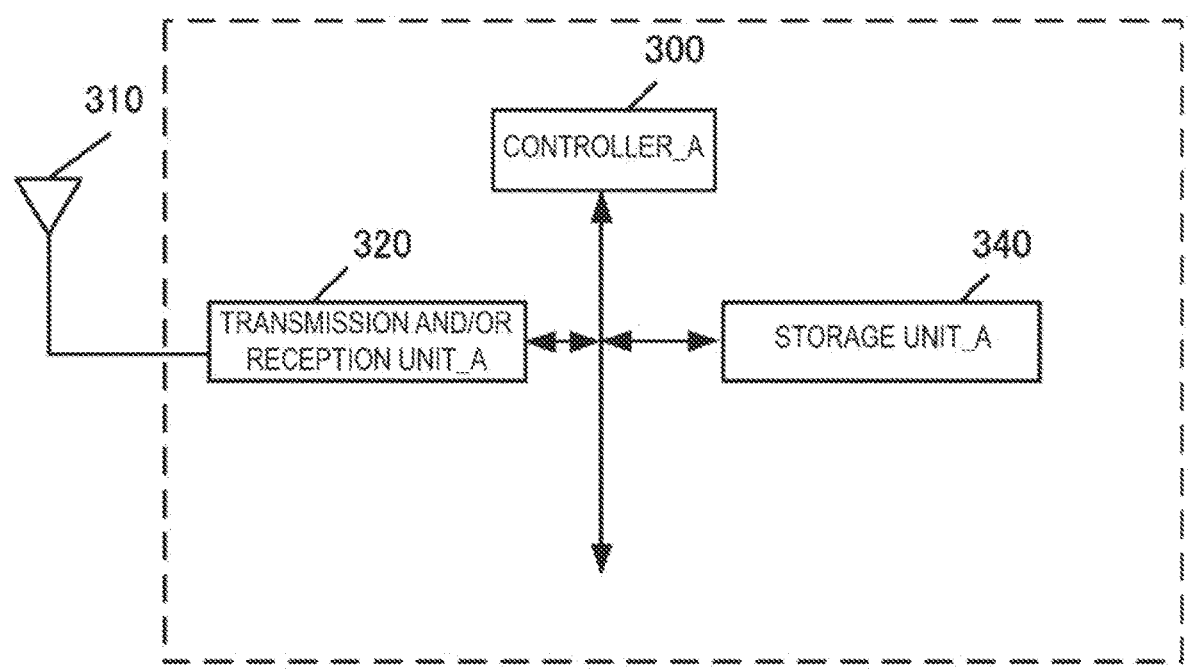
FIG. 3 is a diagram illustrating an apparatus configuration of a UE.

First, an apparatus configuration example of the User Equipment (UE) will be described with reference to FIG. 3. The UE includes a controller_A 300, an antenna 310, a transmission and/or reception unit_A 320, and a storage unit_A 340. The controller_A 300, the transmission and/or reception unit_A 320, and the storage unit_A 340 are connected to each other via a bus. The transmission and/or reception unit_A 320 is connected to the antenna 310.

The controller_A 300 is a function unit to control the operation and the function of the entire UE. The controller_A 300 implements various types of processing of the UE by reading out various programs stored in the storage unit_A 340 and performing the programs as necessary.

The transmission and/or reception unit_A 320 is a function unit for performing radio communication with the base station apparatus (the eNB or the gNB) in the access network via the antenna. In other words, the UE can transmit and/or receive the user data and/or the control information to and/or from the access network apparatus, and/or the core network apparatus, and/or the PDN, and/or the DN by using the transmission and/or reception unit_A 320.

To give detailed description with reference to FIG. 2, the UE can communicate with the base station apparatus (eNB) in the E-UTRAN via the LTE-Uu interface by using the transmission and/or reception unit_A 320. Further, the UE can communicate with the base station apparatus (gNB) in the 5G AN by using the transmission and/or reception unit_A 320. Further, the UE can transmit and/or receive a Non-Access-Stratum (NAS) message to and/or from the AMF via the N1 interface by using the transmission and/or reception unit_A 320. Note that, because the N1 interface is a logical interface, the communication between the UE and the AMF is in actuality performed via the 5G AN.

The storage unit_A 340 is a function unit for storing programs, user data, control information, and the like necessary for each operation of the UE.

2.2. Apparatus Configuration of gNB

Figure 4:
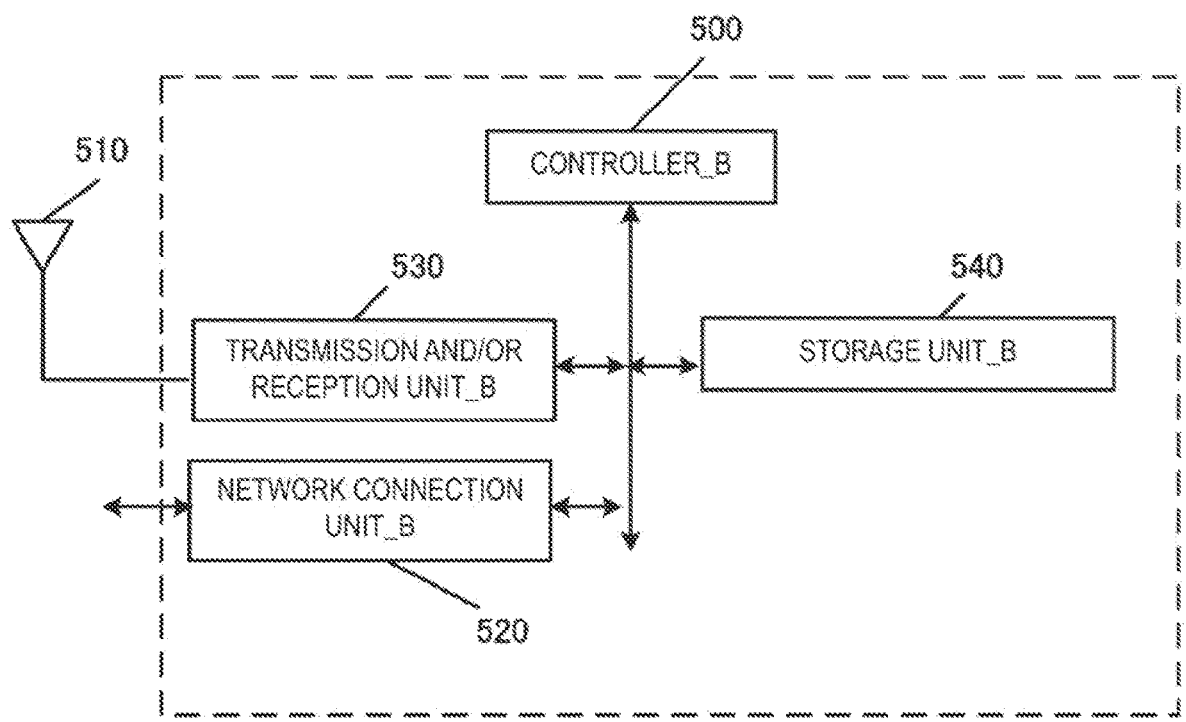
FIG. 4 is a diagram illustrating a configuration of an access network apparatus (gNB) in the 5GS.

Next, an apparatus configuration example of the gNB will be described with reference to FIG. 4. The gNB includes a controller_B 500, an antenna 510, a network connection unit_B 520, a transmission and/or reception unit_B 530, and a storage unit_B 540. The controller_B 500, the network connection unit_B 520, the transmission and/or reception unit_B 530, and the storage unit_B 540 are connected to each other via a bus. The transmission and/or reception unit_B 530 is connected to the antenna 510.

The controller_B 500 is a function unit that controls the operation and the function of the entire gNB. The controller_B 500 implements various types of processing of the gNB by reading out various programs stored in the storage unit_B 540 and performing the programs as necessary.

The network connection unit_B 520 is a function unit for the gNB to communicate with the AMF and/or the UPF. In other words, the gNB can transmit and/or receive the user data and/or the control information to and/or from the AMF and/or the UPF by using the network connection unit_B 520.

The transmission and/or reception unit_B 530 is a function unit for performing radio communication with the UE via the antenna 510. In other words, the gNB can transmit and/or receive the user data and/or the control information to and/or from the UE by using the transmission and/or reception unit_B 530.

To give detailed description with reference to FIG. 2, the gNB present in the 5G AN can communicate with the AMF via the N2 interface and can communicate with the UPF via the N3 interface by using the network connection unit_B 520. Further, the gNB can communicate with the UE by using the transmission and/or reception unit_B 530.

The storage unit_B 540 is a function unit for storing programs, user data, control information, and the like necessary for each operation of the gNB.

2.3. Apparatus Configuration of AMF

Figure 5:
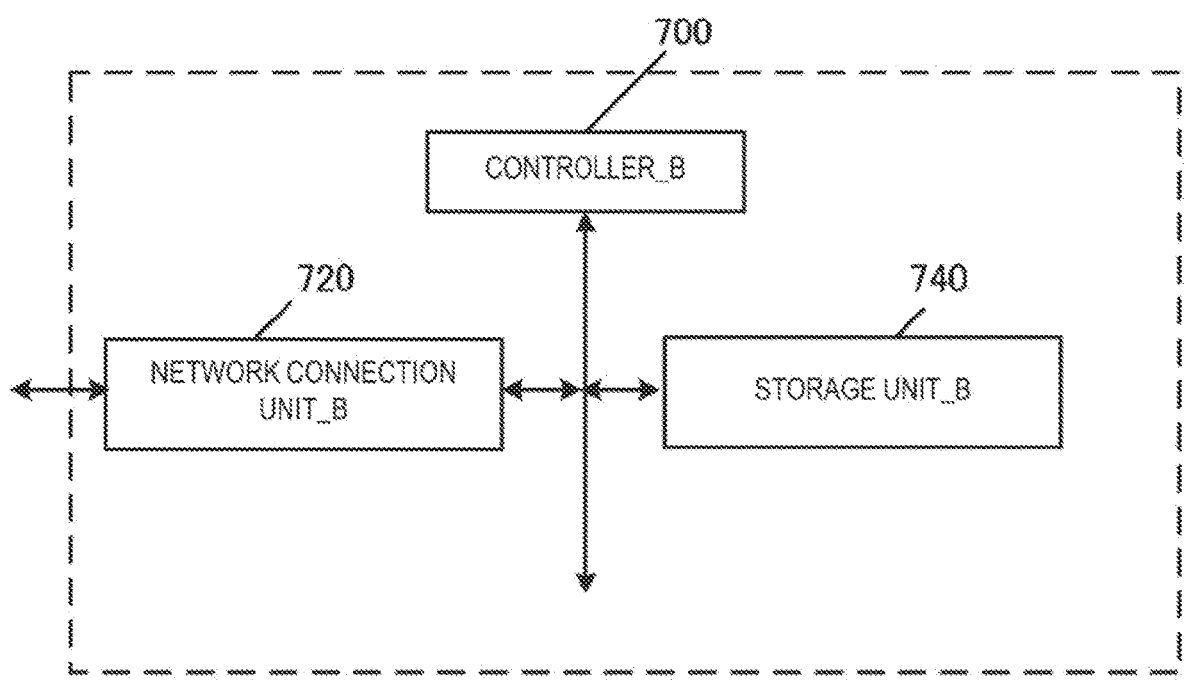
FIG. 5 is a diagram illustrating a configuration of a core network apparatus (AMF/SMF/UPF) in the 5GS.

Next, an apparatus configuration example of the AMF will be described with reference to FIG. 5. The AMF includes a controller_B 700, a network connection unit_B 720, and a storage unit_B 740. The controller_B 700, the network connection unit_B 720, and the storage unit_B 740 are connected to each other via a bus. The AMF may be a node that handles the control plane.

The controller_B 700 is a function unit that controls the operation and the function of the entire AMF. The controller_B 700 implements various types of processing of the AMF by reading out various programs stored in the storage unit_B 740 and performing the programs as necessary.

The network connection unit_B 720 is a function unit for the AMF to connect to the base station apparatus (gNB), and/or the SMF, and/or the PCF, and/or the UDM, and/or the SCEF in the 5G AN. In other words, the AMF can transmit and/or receive the user data and/or the control information to and/or from the base station apparatus (gNB), and/or the SMF, and/or the PCF, and/or the UDM, and/or the SCEF in the 5G AN by using the network connection unit_B 720.

To give detailed description with reference to FIG. 2, the AMF present in the 5GC can communicate with the gNB via the N2 interface, can communicate with the UDM via the N8 interface, can communicate with the SMF via the N11 interface, and can communicate with the PCF via the N15 interface by using the network connection unit_A 620. Further, the AMF can transmit and/or receive a NAS message to and/or from the UE via the N1 interface by using the network connection unit_A 620. Note that, because the N1 interface is a logical interface, the communication between the UE and the AMF is in actuality performed via the 5G AN. Further, in a case that the N26 interface is supported, the AMF can communicate with the MME via the N26 interface by using the network connection unit_A 620.

The storage unit_B 740 is a function unit for storing programs, user data, control information, and the like necessary for each operation of the AMF.

Note that the AMF has a function of exchanging the control message with the RAN using the N2 interface, a function of exchanging the NAS message with the UE using the N1 interface, a function of performing encryption and integrity protection of the NAS message, a function of Registration management (RM), a function of Connection management (CM), a function of Reachability management, a function of Mobility management for the UE and the like, a function of transferring a Session Management (SM) message between the UE and the SMF, a function of Access Authentication (Access Authorization), a Security Anchor Functionality (SEA), a function of Security Context Management (SCM), a function of supporting the N2 interface for a Non-3GPP Interworking Function (N3IWF), a function of supporting transmission and/or reception of a NAS signal to and/or from the UE via the N3IWF, a function of authenticating the UE to be connected via the N3IWF, and the like.

Further, in the registration management, an RM state of each UE is managed. The RM state may be synchronized between the UE and the AMF. The RM state includes a deregistered state (RM-DEREGISTERED state) and a registered state (RM-REGISTERED state). In the RM-DEREGISTERED state, the UE is not registered in the network, and thus the AMF is not able to reach the UE because the UE context in the AMF does not have valid position information and routing information for the UE. In the RM-REGISTERED state, the UE is registered in the network, and thus the UE can receive services that require registration with the network. Note that the RM state may be expressed as a 5GMM state. In this case, the RM-DEREGISTERED state may be expressed as a 5GMM-DEREGISTERED state, and the RM-REGISTERED state may be expressed as a 5GMM-REGISTERED state.

In other words, the 5GMM-REGISTERED may be a state in which each apparatus establishes a 5GMM context, or may be a state in which each apparatus establishes a PDU session context. Note that, in a case that each apparatus is in the state of 5GMM-REGISTERED, the UE_A 10 may initiate transmission and/or reception of the user data and the control message, or may respond to paging. Further, note that in a case that each apparatus is in the state of 5GMM-REGISTERED, the UE_A 10 may perform a registration procedure other than a registration procedure for initial registration and/or a service request procedure.

Further, 5GMM-DEREGISTERED may be a state in which each apparatus does not establish the 5GMM context, may be a state in which position information of the UE_A 10 is not understood by the network, or may be a state in which the network is unable to reach the UE_A 10. Note that, in a case that each apparatus is in the state of 5GMM-DEREGISTERED, the UE_A 10 may initiate the registration procedure, or may establish the 5GMM context by performing the registration procedure.

Further, in the connection management, a CM state of each UE is managed. The CM state may be synchronized between the UE and the AMF. The CM state includes a disconnected state (CM-IDLE state) and a connected state (CM-CONNECTED state). In the CM-IDLE state, the UE is in the RM-REGISTERED state but does not have a NAS signalling connection established between the AMF and the UE via the N1 interface. Also, in the CM-IDLE state, the UE does not have an N2 interface connection (N2 connection) and an N3 interface connection (N3 connection). On the other hand, in the CM-CONNECTED state, the UE has the NAS signalling connection established between the AMF and the UE via the N1 interface. Also, in the CM-CONNECTED state, the UE may have the N2 interface connection (N2 connection) and/or the N3 interface connection (N3 connection).

Further, in the connection management, the CM state in the 3GPP access and the CM state in the non-3GPP access may be separately managed. In this case, the CM state in the 3GPP access may include a disconnected state (CM-IDLE state over 3GPP access) in the 3GPP access and a connected state (CM-CONNECTED state over 3GPP access) in the 3GPP access. Further, the CM state in the non-3GPP access may include a disconnected state (CM-IDLE state over non-3GPP access) in the non-3GPP access and a connected state (CM-CONNECTED state over non-3GPP access) in the non-3GPP access. Note that the disconnected state may be expressed as an idle mode, and the connected state mode may be expressed as a connected mode.

Note that the CM state may be expressed as a 5GMM mode. In this case, the disconnected state may be expressed as a 5GMM disconnected mode (5GMM-IDLE mode), and the connected state may be expressed as a 5GMM connected mode (5GMM-CONNECTED mode). Further, the disconnected state in the 3GPP access may be expressed as a 5GMM disconnected mode (5GMM-IDLE mode over 3GPP access) in the 3GPP access, and the connected state in the 3GPP access may be expressed as a 5GMM connected mode (5GMM-CONNECTED mode over 3GPP access) in the 3GPP access. Further, the disconnected state in the non-3GPP access may be expressed as a 5GMM disconnected mode (5GMM-IDLE mode over non-3GPP access) in the non-3GPP access, and the connected state in the non-3GPP access may be expressed as a 5GMM connected mode (5GMM-CONNECTED mode over non-3GPP access) in the non-3GPP access. Note that the 5GMM disconnected mode may be expressed as an idle mode, and the 5GMM connected mode may be expressed as a connected mode.

In addition, one or more AMFs may be deployed within the core network_B. In addition, the AMF may be an NF that manages one or more Network Slice Instances (NSI). In addition, the AMF may also be a Common Control Plane Network Function (Common CPNF, or CCNF) shared among multiple NSIs.

Note that the N3IWF is an apparatus and/or a function that is deployed between the non-3GPP access and the 5GC in a case that the UE connects to the 5GS via the non-3GPP access.

2.4. Apparatus Configuration of SMF

Next, an apparatus configuration example of the SMF will be described with reference to FIG. 5. The SMF includes a controller_B 700, a network connection unit_B 720, and a storage unit_B 740. The controller_B 700, the network connection unit_B 720, and the storage unit_B 740 are connected to each other via a bus. The SMF may be a node that handles the control plane.

The controller_B 700 is a function unit that controls the operation and the function of the entire SMF. The controller_B 700 implements various types of processing of the SMF by reading out various programs stored in the storage unit_B 740 and performing the programs as necessary.

The network connection unit_B 720 is a function unit for the SMF to connect to the AMF, and/or the UPF, and/or the PCF, and/or the UDM. In other words, the SMF can transmit and/or receive the user data and/or the control information to and/or from the AMF, and/or the UPF, and/or the PCF, and/or the UDM by using the network connection unit_B 720.

To give detailed description with reference to FIG. 2, the SMF present in the 5GC can communicate with the AMF via the N11 interface, can communicate with the UPF via the N4 interface, can communicate with the PCF via the N7 interface, and can communicate with the UDM via the N10 interface by using the network connection unit_A 620.

The storage unit_B 740 is a function unit for storing programs, user data, control information, and the like necessary for each operation of the SMF.

The SMF has a function of Session Management for establishment, correction, release, and the like of the PDU session, a function of IP address allocation for the U E and management of the IP address allocation, a function of selection and control of the UPF, a function of configuration of the UPF for routing traffic to an appropriate destination (transmission destination), a function of transmitting and/or receiving an SM part of the NAS message, a function of giving a notification that downlink data has arrived (Downlink Data Notification), a function of providing SM information specific to the AN (for each individual AN) that is transmitted to the AN via the N2 interface through the AMF, a function of determining a Session and Service Continuity mode (SSC mode) for a session, a roaming function, and the like.

2.5. Apparatus Configuration of UPF

Next, an apparatus configuration example of the UPF will be described with reference to FIG. 5. The UPF includes a controller_B 700, a network connection unit_B 720, and a storage unit_B 740. The controller_B 700, the network connection unit_B 720, and the storage unit_B 740 are connected to each other via a bus. The UPF may be a node that handles the control plane.

The controller_B 700 is a function unit that controls the operation and the function of the entire UPF. The controller_B 700 implements various types of processing of the UPF by reading out various programs stored in the storage unit_B 740 and performing the programs as necessary.

The network connection unit_B 720 is a function unit for the UPF to connect to the base station apparatus (gNB), and/or the SMF, and/or the DN in the 5G AN. In other words, the UPF can transmit and/or receive the user data and/or the control information to and/or from the base station apparatus (gNB), and/or the SMF, and/or the DN in the 5G AN by using the network connection unit_B 720.

To give detailed description with reference to FIG. 2, the UPF present in the 5GC can communicate with the gNB via the N3 interface, can communicate with the SMF via the N4 interface, can communicate with the DN via the N6 interface, and can communicate with another UPF via the N9 interface by using the network connection unit_A 620.

The storage unit_B 740 is a function unit for storing programs, user data, control information, and the like necessary for each operation of the UPF.

The UPF has a function as an anchor point for intra-RAT mobility or inter-RAT mobility, a function as an external PDU session point for two-way connection with the DN (in other words, a function of forwarding the user data as a gateway between the DN and the core network_B), a function of routing and forwarding packets, a function of Uplink Classifier (UL CL) of supporting routing of multiple traffic flows for a single DN, a function of Branching point of supporting a multi-homed PDU session, a function of Quality of Service (QoS) processing for the user plane, a function of verification of uplink traffic, buffering of downlink packets, a function of triggering Downlink Data Notification, and the like.

Furthermore, the UPF may serve as a gateway for IP communication and/or non-IP communication. Furthermore, the UPF may have a function of transferring IP communication or a function to perform conversion between non-1P communication and IP communication. Further, the multiple gateways deployed may serve as gateways for connecting the core network_B with a single DN. Note that the UPF may have connectivity with another NF or may be connected to each apparatus via another NF.

Note that the user plane refers to the user data that is transmitted and/or received between the UE and the network. The user plane may be transmitted and/or received by using a PDN connection or a PDU session. Further, in a case of the EPS, the user plane may be transmitted and/or received by using the LTE-Uu interface, and/or the S1-U interface, and/or the S5 interface, and/or the S8 interface, and/or the SGi interface. Further, in a case of the 5GS, the user plane may be transmitted and/or received via an interface between the UE and the NG RAN, and/or the N3 interface, and/or the N9 interface, and/or the N6 interface. The user plane may be hereinafter expressed as a U-Plane.

Further, the control plane refers to a control message that is transmitted and/or received for performing communication control of the UE or the like. The control plane may be transmitted and/or received by using Non-Access-Stratum (NAS) signaling connection between the UE and the MME. Further, in a case of the EPS, the control plane may be transmitted and/or received by using the LTE-Uu interface and the S1-MME interface. Further, in a case of the 5GS, the control plane may be transmitted and/or received by using an interface between the UE and the NG RAN and the N2 interface. The control plane may be hereinafter expressed as a control plane, or may be expressed as a C-Plane.

Further, a User Plane (U-Plane or UP) may be a communication path for transmitting and/or receiving user data, and may include multiple bearers. Furthermore, a Control Plane (C-Plane or CP) may be a communication path for transmitting and/or receiving a control message, and may include multiple bearers.

2.6. Description of Other Apparatuses and/or Functions

Next, other apparatuses and/or functions will be described.

The PCF has a function of providing a policy rule and the like.

Further, the UDM has an authentication information processing (Authentication credential processing) function, a user identification processing function, an access authentication function, a registration/mobility management function, a subscriber information management (subscription management) function, and the like.

Further, the PCRF is connected to the PGW and/or the PDN, and has a function of managing QoS for data delivery or the like. For example, the PCRF manages QoS of a communication path between the UE_A 10 and the PDN. Furthermore, the PCRF may be an apparatus to create and/or manage a Policy and Charging Control (PCC) rule and/or a routing rule used by each apparatus for transmitting and/or receiving user data.

Further, the HSS is connected to the MME and/or the SCEF, and has a function of, for example, managing subscriber information. The subscriber information in the HSS is referenced during access control of the MME, for example. Moreover, the HSS may be connected to a location management device different from the MME.

Further, the SCEF is connected to the DN and/or the PDN, the MME, and the HSS, and has a function as, for example, a relay apparatus that transfers the user data as a gateway for connecting the DN and/or the PDN with the core network_A. Note that the SCEF may serve as a gateway for non-IP communication. Furthermore, the SCEF may have a function to perform conversion between non-IP communication and IP communication. Multiple gateways like this may be deployed in the core network_A. The SCEF may be outside or inside the core network.

3. Description of Terms, Pieces of Identification Information, and Procedures Used in Each Embodiment Terms, pieces of identification information, and procedures, at least one of which is used in each embodiment, will be described in advance.

3.1. Description of Terms and Pieces of Identification Information Used in Each Embodiment First, highly technical terms and pieces of identification information used in procedures that are used in each embodiment will be described in advance.

The network refers to at least some of the access network_B, the core network_B, and the DN. One or more apparatuses included in at least some of the access network_B, the core network_B, and the DN may also be referred to as a network or a network apparatus. Specifically, the expression "the network performs transmission and/or reception of a message and/or performs processing" may signify that "an apparatus (a network apparatus and/or a control apparatus) in the network performs transmission and/or reception of a message and/or performs processing". Conversely, the expression "the apparatus in the network performs transmission and/or reception of a message and/or performs processing" may signify that "a network performs transmission and/or reception of a message and/or performs processing."

A session management (SM) message (also referred to as a Non-Access-Stratum (NAS) SM message) may be a NAS message used in a procedure for the SM, or may be a control message transmitted and/or received between the UE_A 10 and the SMF_A 230 via the AMF_A 240. Furthermore, the SM message may include a PDU session establishment request message, a PDU session establishment accept message, a PDU session completion message, a PDU session reject message, a PDU session modification request message, a PDU session modification accept message, a PDU session modification response message, and the like. The procedure for SM may include a PDU session establishment procedure.

Further, the 5G System (5GS) service may be a connection service provided using the core network_B 190. Further, the 5GS service may be a service different from the EPS service, or a service the same as the EPS service.

Further, a non 5GS service may be a service other than the 5GS service, and may include an EPS service and/or a non EPS service.

Further, a single registration mode is a mode in which the UE_A 10 maintains a common registered state for the 5GMM state and the EMM state in a case that an N1 mode and an S1 mode are available.

Further, a single registration mode is a mode in which the UE_A 10 maintains a common registered state for the 5GMM state and the EMM state in a case that an N1 mode and an S1 mode are available.

Further, the S1 mode is a mode in which the UE_A 10 is allowed to access the EPC via the E-UTRAN. In other words, the S1 mode may be a mode in which transmission and/or reception of a message using the S1 interface is performed. Note that the S1 interface may be configured in the S1-MME interface and the S1-U interface.

Further, the N1 mode is a mode in which the UE_A 10 is allowed to access the 5GC via the 5G access network. In other words, the N1 mode may be a mode in which transmission and/or reception of a message using the N1 interface is performed.

Further, the Access Point Name (APN) may be identification information for identifying an external network such as the core network and/or the PDN. Furthermore, the APN can also be used as information for selecting a gateway such as the PGW_A 30/UPF_A 235 for connecting the core network A_90.

Further, a Traffic Flow Template (TFT) indicates all packet filters associated with the EPS bearer. The TFT is information for identifying some pieces of user data to be transmitted and/or received, and thus the UE_A 10 uses the EPS bearer associated with the TFT to transmit and/or receive the user data identified by the TFT. In still other words, the UE_A 10 uses a Radio Bearer (RB) associated with the TFT to transmit and/or receive the user data identified by the TFT. The TFT may associate the user data such as application data to be transmitted and/or received with an appropriate transfer path, and may be identification information for identifying the application data. The UE_A 10 may use the default bearer to transmit and/or receive the user data which cannot be identified by the TFT. The UE_A 10 may store in advance the TFT associated with the default bearer.

Further, a Packet Data Network (PDN) type indicates a type of the PDN connection, and includes IPv4, IPv6, IPv4v6, and non-IP. In a case that IPv4 is specified, it is indicated that transmission and/or reception of data is performed by using IPv4. In a case that IPv6 is specified, it is indicated that transmission and/or reception of data is performed by using IPv6. In a case that IPv4v6 is specified, it is indicated that transmission and/or reception of data is performed by using IPv4 or IPv6. In a case that non-IP is specified, it is indicated that communication is performed by using a communication method other than the IP instead of communication using the IP.

Further, the EPS bearer is a logical communication path established between the UE and the PGW, and is a communication path configuring the PDN connection. The EPS bearer includes a default bearer (also referred to as a default EPS bearer) and a dedicated bearer (also referred to as a dedicated EPS bearer).

Further, the default bearer is an EPS bearer first established during the PDN connection, and only one default bearer can be established during one PDN connection. The default bearer is an EPS bearer that can be used for communication of user data not associated with the Traffic Flow Template (TFT).

Further, the dedicated bearer is an EPS bearer established after the default bearer is established during the PDN connection, and one or more dedicated bearers can be established during one PDN connection. The dedicated bearer is an EPS bearer that can be used for communication of user data associated with the TFT.

Further, the Protocol Data Unit/Packet Data Unit (PDU) session can be defined as relation between the DN that provides a PDU connectivity service and the UE, but may be connectivity established between the UE and an external gateway. In the 5GS, the UE establishes the PDU session via the access network_B and the core network_B, and can thereby perform transmission and/or reception of the user data with the DN by using the PDU session. Here, the external gateway may be the UPF, the SCEF, or the like. The UE can perform transmission and/or reception of the user data with an apparatus such as an application server deployed in the DN by using the PDU session.

Note that each apparatus (the UE, and/or the access network apparatus, and/or the core network apparatus) may correlate one or more pieces of identification information to the PDU session for management. Note that these pieces of identification information may include one or more of the DNN, the TFT, the PDU session type, application identification information, NSI identification information, access network identification information, and the SSC mode, and may further include other pieces of information. Furthermore, in a case that multiple PDU sessions are established, respective pieces of identification information correlated to the PDU sessions may be the same contents or may be different contents.

Further, the Data Network Name (DNN) may be identification information for identifying an external network such as the core network and/or the DN. Furthermore, the DNN can also be used as information for selecting a gateway such as the PGW_A 30/UPF_A 235 connecting the core network_B 190. Further, the DNN may correspond to the Access Point Name (APN).

Further, the Protocol Data Unit/Packet Data Unit (PDU) session type indicates a type of the PDU session, and includes IPv4, IPv6, Ethernet, and Unstructured. In a case that IPv4 is specified, it is indicates that transmission and/or reception of data is performed by using IPv4. In a case that IPv6 is specified, it is indicated that transmission and/or reception of data is performed by using IPv6. In a case that Ethernet is specified, it is indicated that transmission and/or reception of an Ethernet frame is performed. Further, Ethernet may indicate that communication using the IP is not performed. In a case that Unstructured is specified, it is indicated that data is transmitted and/or received to and/or from the application server in the DN or the like by using the Point-to-Point (P2P) tunneling technology. As the P2P tunneling technology, for example, encapsulation technology of the UDP/IP may be used. Note that the PDU session type may include the IP in addition to the above. The IP can be specified in a case that the UE can use both IPv4 and IPv6.

Further, a network slice (NS) is a logical network that provides specific network capabilities and network performance. The UE and/or the network can support the network slice (NW slice (NS)) in the 5GS.

Moreover, a network slice instance (NSI) includes an instance (entity) of the network function (NF) and a set of required resources, and forms a deployed network slice. Here, the NF is a processing function in the network and is employed or defined in the 3GPP. The NSI is an entity of one or more NSs configured in the core network_B. The NSI may include a virtual Network Function (NF) generated using a Network Slice Template (NST). Here, the NST is associated with a resource request for providing a required communication service or capability, and is a logical expression of one or more NFs. Specifically, the NSI may be an aggregation including multiple NFs in the core network_B 190. The NSI may be a logical network configured to classify the user data delivered through a service or the like. The NS may include one or more NFs. The NF included in the NS may be an apparatus shared by another NS or otherwise. The UE and/or the apparatus in the network can be allocated to one or more NSs, based on registration information such as NSSAI, and/or S-NSSAI, and/or a UE usage type, and/or one or more NSI IDs, and/or the APN. Note that the UE usage type is a parameter value which is included in the registration information of the UE and used for identifying the NSI. The UE usage type may be stored in the HSS. The AMF may select the SMF and the UPF, based on the UE usage type.

Further, the Single Network Slice Selection Assistance Information (S-NSSAI) is information for identifying the NS. The S-NSSAI may be include only a Slice/Service type (SST), or may include both of the SST and a Slice Differentiator (SD). Here, the SST is information indicating operation of the NS that is expected in terms of the functions and services. Further, the SD may be information for interpolating the SST in a case that one NSI is selected out of multiple NSIs indicated by the SST. The S-NSSAI may be information specific to an individual PLMN, or may be standard information common to PLMNs. Further, the network may store one or more pieces of S-NSSAI in the registration information of the UE as default S-NSSAI. Note that, in a case that the S-NSSAI is the default S-NSSAI and the UE does not transmit valid S-NSSAI to the network in a registration request message, the network may provide the NS related to the UE.

Further, the Network Slice Selection Assistance Information (NSSAI) is a collection of pieces of the S-NSSAI. Each piece of the S-NSSAI included in the NSSAI is information for assisting the access network or the core network to select the NSI. The UE may store the NSSAI allowed by the network for each PLMN. Further, the NSSAI may be information used to select the AMF.

The Session and Service Continuity (SSC) mode indicates a mode of Session and Service Continuity supported by a system and/or each apparatus in the 5G system (5GS). To be more specific, the SSC mode may be a mode indicating a type of the session and service continuity supported by a PDU session established between the UE_A 10 and the UPF. Note that the SSC mode may be a mode indicating a type of the session and service continuity configured for each PDU session. Further, the SSC mode may include three modes of SSC mode 1, SSC mode 2, and SSC mode 3. Note that the SSC mode associated with the PDU session may not be changed while the PDU session maintains.

Further, the SSC mode 1 is a mode in which the network maintains the connectivity service provided for the UE_A 10. Note that, in a case that the PDU session type associated with the PDU session is IPv4 or IPv6, the IP address may be preserved in a case of the session and service continuity.

Further, the SSC mode 1 may be a mode of the session and service continuity in which the same UPF is continuously maintained regardless of access technology used by the UE_A 10 to connect to the network. To be more specific, the SSC mode 1 may be a mode in which even in a case that the mobility of the UE_A 10 occurs, the session and service continuity is achieved without changing the UPF used as a PDU session anchor of the established PDU session.

Further, the SSC mode 2 is a mode in which the network releases the connectivity service provided for the UE_A 10 and its corresponding PDU session. Note that, in the SSC mode 2, in a case that the PDU session type associated with the PDU session is IPv4, IPv6, or IPv4v6, the IP address allocated to the UE_A 10 may be released in a case of changing the anchor of the PDU session.

Further, the SSC mode 2 may be a mode of the session and service continuity in which the same UPF is continuously maintained only in a serving area of the UPF. To be more specific, the SSC mode 2 may be a mode in which as long as the UE_A 10 is in the serving area of the UPF, the session and service continuity is achieved without changing the UPF used by the established PDU session. Further, the SSC mode 2 may be a mode in which in a case that the mobility that the UE_A 10 leaves the serving area of the UPF occurs, the session and service continuity is achieved by changing the UPF used by the established PDU session.

Here, the serving area of the UPF may be an area in which one UPF can provide a session and service continuity function, or a subset of the access network such as the RAT or the cell used in a case that the UE_A 10 connects to a network. Further, the subset of the access network may be a network including one or multiple RATs and/or cells.

Note that the change of the anchor point of the PDU session of the SSC mode 2 may be implemented by each apparatus performing an anchor point change procedure of the PDU session of the SSC mode 2.

Further, the SSC mode 3 is a mode in which the UE_A 10 is informed of the change of the user plane while the network ensures that the connectivity is not disenabled. Note that, in a case of the SSC mode 3, in order to implement better connectivity service, a PDU session that passes through a new PDU session anchor point may be established before the established PDU session is disconnected. Further, in the SSC mode 3, in a case that the PDU session type associated with the PDU session is IPv4, IPv6, or IPv4v6, the IP address allocated to the UE may not be maintained in a case of changing the anchor of the PDU session.

Further, the SSC mode 3 may be a mode of the session and service continuity that allows a new PDU session and/or communication path to be established via a new UPF to the same DN before disconnecting the PDU session and/or the communication path established between the UE_A 10 and the UPF. Further, the SSC mode 3 may be a mode of the session and service continuity that allows the UE_A 10 to be multi-homed. Further, the SSC mode 3 may be a mode that allows the session and service continuity using multiple PDU sessions and/or the UPFs correlated to the PDU sessions. In other words, in the case of the SSC mode 3, each apparatus may achieve the session and service continuity using the multiple PDU sessions, or may achieve the session and service continuity using the multiple UPFs.

Here, in the case that each apparatus establishes a new PDU session and/or communication path, a new UPF may be selected by the network, or a new UPF may be an optimal UPF for a place at which the UE_A 10 connects to the network. Further, in a case that the multiple PDU sessions and/or the UPFs used by the PDU sessions are effective, the UE_A 10 may correlate the application and/or flow communications to a new established PDU session immediately or based on the completion of the communications.

Note that the change of the anchor point of the PDU session of the SSC mode 3 may be implemented by each apparatus performing an anchor point change procedure of the PDU session of the SSC mode 3.

Further, a default SSC mode is an SSC mode used by the UE_A 10 and/or network in a case that a specific SSC mode is not determined. Specifically, the default SSC mode may be an SSC mode used by the UE_A 10 in a case of no SSC mode requested from the application, and/or a case of no policy of the UE_A 10 for determining an SSC mode for the application. Further, the default SSC mode may be an SSC mode used by the network in the case of no SSC mode requested from the UE_A 10.

Note that the default SSC mode may be configured for each DN, configured for each PDN, or configured for each UE_A 10 and/or subscriber, based on the subscriber information and/or the operator policy and/or the policy of the UE_A 10. Further, the default SSC mode may be information indicating SSC mode 1, SSC mode 2, or SSC mode 3.

The anchor point change procedure of the PDU session is a procedure in which the PDU session used for transmission and/or reception of the user data is switched from the first PDU session to the second PDU session. The anchor point change procedure of the PDU session may include the anchor point change procedure of the PDU session of the SSC mode 2 and the anchor point change procedure of the PDU session of the SSC mode 3.

Here, the first PDU session may be a PDU session used for user data communication before the change of the anchor point of the PDU session. The second PDU session may be a PDU session used for user data communication after the change of the anchor point of the PDU session.

The anchor point change procedure of the PDU session of the SSC mode 2 is a procedure of establishing the second PDU session after the first PDU session is released. The anchor point change procedure of the PDU session of the SSC mode 2 may be a procedure initiated by the network.

Specifically, the anchor point change procedure of the PDU session of the SSC mode 2 may be a procedure where in a state in which the first PDU session is established, the AMF and/or the SMF transmits a PDU session release command message to the UE and then the UE that has received the PDU session release command message initiates the PDU session establishment procedure to establish the second PDU session.

Note that the PDU session release command message may include information indicating the change of the anchor point of the PDU session. Further, the information indicating the change of the anchor point of the PDU session may be a reactivation request (reactivation requested) being the 39-th 5GSM cause value (5GSM cause #39).

Further, the PDU session establishment request message that is transmitted from the UE to the AMF and/or the SMF in the PDU session establishment procedure for establishing the second PDU session, and/or the NAS message that is transmitted and/or received for forwarding the PDU session establishment request message may include a PDU session ID for identifying the first PDU session and a PDU session ID for identifying the second PDU session. Further, the PDU session type, the SSC mode, the DNN, and the S-NSSAI that are transmitted and/or received in the PDU session establishment procedure for establishing the second PDU session may be the same as the PDU session type, the SSC mode, the DNN, and the S-NSSAI that are transmitted and/or received in the PDU session establishment procedure for establishing the first PDU session.

The anchor point change procedure of the PDU session of the SSC mode 3 is a procedure of establishing the second PDU session before the first PDU session is released. The anchor point change procedure of the PDU session of the SSC mode 3 may be a procedure initiated by the network.

Specifically, the anchor point change procedure of the PDU session of the SSC mode 3 may be a procedure where in a state in which the first PDU session is established, the AMF and/or the SMF transmits a PDU session modification command message to the UE, and then the UE that has received the PDU session modification command message initiates the PDU session establishment procedure to establish the second PDU session.

Note that the PDU session modification command message may include information indicating the change of the anchor point of the PDU session. Further, the information indicating the change of the anchor point of the PDU session may be a reactivation request (reactivation requested) being the 39-th 5GSM cause value (5GSM cause #39).

Further, the PDU session establishment request message that is transmitted from the UE to the AMF and/or the SMF in the PDU session establishment procedure for establishing the second PDU session, and/or the NAS message that is transmitted and/or received for forwarding the PDU session establishment request message may include a PDU session ID for identifying the first PDU session and a PDU session ID for identifying the second PDU session. Further, the PDU session type, the SSC mode, the DNN, and the S-NSSAI that are transmitted and/or received in the PDU session establishment procedure for establishing the second PDU session may be the same as the PDU session type, the SSC mode, the DNN, and the S-NSSAI that are transmitted and/or received in the PDU session establishment procedure for establishing the first PDU session.

Further, the SSC mode 4 is an SSC mode that is different from any of the SSC mode 1, the SSC mode 2, and the SSC mode 3, and is an SSC mode in which the session and service continuity can be implemented by changing the anchor point of the PDU session. Note that, in the SSC mode 4, in a case that the PDU session type associated with the PDU session is IPv4, IPv6, or IPv4v6, the IP address allocated to the UE may be maintained in a case of changing the anchor of the PDU session.

In other words, the SSC mode 4 may be an SSC mode in which the IP address allocated to the UE is maintained even in a case that the anchor point change procedure of the PDU session of the SSC mode 2 is performed. Further, the SSC mode 4 may be an SSC mode in which the IP address allocated to the UE is maintained even in a case that the anchor point change procedure of the PDU session of the SSC mode 3 is performed.

Note that the SSC mode 4 needs not be limited to these, and only needs to be an SSC mode that is different from any of the SSC mode 1, the SSC mode 2, and the SSC mode 3.

A tracking area in the present embodiment is one or multiple ranges which the core network manages and which can be represented by the position information of the UE_A 10. The tracking area may include multiple cells. Furthermore, the tracking area may be a range in which a control message such as paging is broadcast, or a range in which the UE_A 10 can move without a handover procedure. Furthermore, the tracking area may be a routing area, a location area, or those similar to them. The tracking area hereinafter may be Tracking Area (TA).

A TA list in the present embodiment is a list including one or multiple TAs allocated to the UE_A 10 by the network. Note that while the UE_A 10 is moving within one or multiple TAs included in the TA list, the UE_A 10 may be able to move without performing a tracking area update procedure. In other words, for the UE_A 10, the TA list may be an information group indicating an area in which the UE_A 10 can move without performing the tracking area update procedure. Note that the TA list may be expressed as a TAI list including one or multiple Tracking area identities (TAIs). In the following, the TAI list may refer to the TA list.

A Local Area Data Network (LADN) is a DN to which the UE is connectable only at a specific location, and provides connectivity to the specific DNN (that is, the LADN DNN).

LADN information is information related to the LADN. The LADN information may be information indicating a specific LADN available for the UE. The LADN information may include the LADN DNN and LADN service area information. The LADN DNN may be a type of the DNN, and may be a DNN used in a case that the PDU session is established for the LADN. Further, the LADN DNN may be information indicating the LADN, and may be information indicating the DN that is dealt with as the LADN. Further, the LADN service area information may be information indicating the LADN service area. Further, the LADN service area information may be provided as a set of tracking areas, or may be provided as a Tracking area identity (TAI) list. Note that the LADN service area may be an area in which establishment of the PDU session for the LADN is enabled, or may be an area in which connection to the LADN is enabled.

The PDU session for the LADN (PDU session for LADN) is a PDU session associated with the DNN that is associated with the LADN. The PDU session for the LADN may be a PDU session established for the LADN. In other words, the PDU session for the LADN may be a PDU session established between the UE and the LADN, or may be a PDU session used for user data communication between the UE and the LADN. Note that the PDU session for the LADN may be a PDU session that can be established only in the LADN service area.

Narrowband IoT (NB-IoT) is Radio Access Technology (RAT) with its band being limited. The NB-IoT may be a RAT for providing a communication service for an IoT terminal, or may be a RAT in which a part of the functions is limited. Further, the NB-IoT may be a RAT for configuring the E-UTRAN. Note that the RAT for configuring the E-UTRAN other than the NB-IoT may be a WB-E-UTRAN. Further, a mode of the UE for connecting to the core network and/or the DN by using the NB-IoT may be expressed as an NB-N1 mode. Conversely, in addition, a mode of the UE for connecting to the core network and/or the DN by using a RAT other than the NB-IoT may be expressed as a WB-N1 mode.

The multi-homed PDU Session is a PDU session established by using multiple UPFs connected to the DN. The multi-homed PDU session may be a PDU session established for a single DN, or may be a PDU session established for different DNs. Further, the multi-homed PDU session may be expressed as a Multi-homed IPv6 PDU Session.

Ultra-Reliable and Low Latency Communications (URLLC) are communications in which high reliability and/or low latency is achieved. The URLLC may be one of major communication services provided in the 5GS. The functions constituting the URLLC may include redundant communication and IP address preservation. Note that the expression "the URLLC is supported" may signify that the redundant communication is supported, or may signify that the IP address preservation is supported. Further, the expression "the URLLC is supported" may signify that communication of the user data using the same IP address can be preserved even in a case that the anchor point of the PDU session is changed. Further, the expression "the URLLC is supported" may signify that the QoS flow associated with a 5G QoS Identifier (5QI) for the URLLC is supported, may signify that a QoS rule associated with the QoS flow is supported, or may signify that establishment of the PDU session associated with the QoS rule is supported.

The redundant communication (Redundant Transmission) refers to communication whose transmission and/or reception of the user data is made to be redundant. The redundant communication may be one of the technologies for implementing the URLLC. Further, the redundant communication may be communication with higher reliability than communication using a single user plane tunnel. Note that the user plane tunnel may refer to a transfer path used for transmission and/or reception of the user data between the apparatuses, and may refer to a transfer path established on the interface in which the transmission and/or reception of the user data is performed.

Here, the redundant communication may include a first type of the redundant communication, a second type of the redundant communication, and a third type of the redundant communication.

The first type of the redundant communication refers to communication in which transmission and/or reception of the user data is made to be redundant between the UE and the network by using multiple communication paths via different access networks. The UE may implement the first type of the redundant communication by using multiple IP addresses.

Here, the first type of the redundant communication may be implemented with multiple PDU sessions. In this case, the UE may implement the first type of the redundant communication by using multiple PDU sessions established via different access networks. In other words, the UE may implement the first type of the redundant communication by using multiple PDU session IDs.

Further, the first type of the redundant communication may be implemented with a single PDU session. To be more specific, the first type of the redundant communication may be implemented with a multi-access PDU session. In this case, the UE may implement the first type of the redundant communication by using a single PDU session. In other words, the UE may implement the first type of the redundant communication by using a single PDU session ID.

The second type of the redundant communication refers to communication whose transmission and/or reception of the user data is made to be redundant between the UE and the network by using multiple communication paths via a single access network. The UE may implement the second type of the redundant communication by using multiple IP addresses.

Here, the second type of the redundant communication may be implemented with multiple PDU sessions. In this case, the UE may implement the second type of the redundant communication by using multiple PDU sessions established via a single access network. In other words, the UE may implement the second type of the redundant communication by using multiple PDU session IDs.

Further, the second type of the redundant communication may be implemented with a single PDU session. To be more specific, the second type of the redundant communication may be implemented with the multi-homed PDU session. In this case, the UE may implement the second type of the redundant communication by using a single PDU session. In other words, the UE may implement the second type of the redundant communication by using a single PDU session ID.

The third type of the redundant communication refers to communication in which transmission and/or reception of the user data is made to be redundant between the access network or the core network and the network. The UE may implement the third type of the redundant communication by using a single IP address.

Here, the third type of the redundant communication may be implemented with a single PDU session. In this case, the UE may implement the third type of the redundant communication by using a single PDU session. In other words, the UE may implement the third type of the redundant communication by using a single PDU session ID.

The IP address preservation is a technology in which the same IP address can be continuously used. In a case that the IP address preservation is supported, the UE can continuously use the same IP address for communication of the user data even in a case that the UE moves out of the TA. In other words, in a case that the IP address preservation is supported, each apparatus can continuously use the same IP address for communication of the user data even in a case that the anchor point of the PDU session is changed.

The 1st identification information is information indicating whether or not the UE supports the URLLC. The 1st identification information may be information represented by bits that configure a 5GMM capability information element indicating capability of the UE in 5G. Further, the 1st identification information may be information that is selected and determined based on a configuration of the UE, and/or a state of the UE, and/or a user policy, and/or a request for an application.

Further, the 1st identification information may be information including one or multiple meanings indicated by one or more pieces of the identification information out of the 2nd identification information to the 6th identification information. In other words, the 1st identification information may be information including one or more pieces of the identification information out of the 2nd identification information to the 6th identification information. Further, the 1st identification information to the 6th identification information may be transmitted and/or received as separate pieces of identification information, or may be transmitted and/or received as a single piece of identification information.

The 2nd identification information is information indicating whether or not the UE supports the redundant communication. The 2nd identification information may be information represented by bits that configure the 5GMM capability information element indicating capability of the UE in 5G. Further, the 2nd identification information may be information that is selected and determined based on a configuration of the UE, and/or a state of the UE, and/or a user policy, and/or a request for an application.

Further, the 2nd identification information may be information indicating which type of the redundant communication is supported. For example, the 2nd identification information may be information indicating that the first type of the redundant communication is supported, may be information indicating that the second type of the redundant communication is supported, or may be information indicating that the third type of the redundant communication is supported.

Further, the 2nd identification information may be information including one or multiple meanings indicated by one or more pieces of the identification information out of the 3rd identification information to the 5th identification information. In other words, the 2nd identification information may be information including one or more pieces of the identification information out of the 3rd identification information to the 5th identification information. Further, the 2nd identification information to the 5th identification information may be transmitted and/or received as separate pieces of identification information, or may be transmitted and/or received as a single piece of identification information.

The 3rd identification information is information indicating whether or not the UE supports the first type of the redundant communication. The 3rd identification information may be information represented by bits that configure the 5GMM capability information element indicating capability of the UE in 5G. Further, the 3rd identification information may be information that is selected and determined based on a configuration of the UE, and/or a state of the UE, and/or a user policy, and/or a request for an application.

The 4th identification information is information indicating whether or not the UE supports the second type of the redundant communication. The 4th identification information may be information represented by bits that configure the 5GMM capability information element indicating capability of the UE in 5G. Further, the 4th identification information may be information that is selected and determined based on a configuration of the UE, and/or a state of the UE, and/or a user policy, and/or a request for an application.

The 5th identification information is information indicating whether or not the UE supports the third type of the redundant communication. The 5th identification information may be information represented by bits that configure the 5GMM capability information element indicating capability of the UE in 5G. Further, the 5th identification information may be information that is selected and determined based on a configuration of the UE, and/or a state of the UE, and/or a user policy, and/or a request for an application.

The 6th identification information is information indicating whether or not the UE supports the IP address preservation. The 6th identification information may be information represented by bits that configure the 5GMM capability information element indicating capability of the UE in 5G. Further, the 6th identification information may be information that is selected and determined based on a configuration of the UE, and/or a state of the UE, and/or a user policy, and/or a request for an application.

The 11th identification information is information indicating whether or not the network supports the URLLC. The 11th identification information may be information represented by bits that configure a 5GS network function support information element (5GS network feature support information element) indicating capability of the network in 5G. Further, the 11th identification information may be information that is selected and determined by the network, based on the received 1st identification information, and/or the information associated with the DN, and/or the information associated with the NSI, and/or the capability information of the network, and/or the operator policy, and/or the state of the network, and/or the registration information of the user, and the like. Further, the 11th identification information may be information that is selected and determined based on another piece of the identification information that is selected by the network in the present procedure.

Further, the 11th identification information may be information including one or multiple meanings indicated by one or more pieces of the identification information out of the 12th identification information to the 16th identification information. In other words, the 11th identification information may be information including one or more pieces of the identification information out of the 12th identification information to the 16th identification information. Further, the 11th identification information to the 16th identification information may be transmitted and/or received as separate pieces of identification information, or may be transmitted and/or received as a single piece of identification information.

The 12th identification information is information indicating whether or not the network supports the redundant communication. The 12th identification information may be information represented by bits that configure the 5GS network function support information element indicating capability of the network in 5G. Further, the 12th identification information may be information that is selected and determined by the network, based on one or more pieces of the identification information out of the received 2nd identification information to 5th identification information, and/or the information associated with the DN, and/or the information associated with the NSI, and/or the capability information of the network, and/or the operator policy, and/or the state of the network, and/or the registration information of the user, and the like. Further, the 12th identification information may be information that is selected and determined based on another piece of the identification information that is selected by the network in the present procedure.

Further, the 12th identification information may be information indicating which type of the redundant communication is supported. For example, the 12th identification information may be information indicating that the first type of the redundant communication is supported, may be information indicating that the second type of the redundant communication is supported, or may be information indicating that the third type of the redundant communication is supported.

Further, the 12th identification information may be information including one or multiple meanings indicated by one or more pieces of the identification information out of the 13th identification to the 15th identification information. In other words, the 12th identification information may be information including one or more pieces of the identification information out of the 13th identification information to the 15th identification information. Further, the 12th identification information to the 15th identification information may be transmitted and/or received as separate pieces of identification information, or may be transmitted and/or received as a single piece of identification information.

The 13th identification information is information indicating whether or not the network supports the first type of the redundant communication. The 13th identification information may be information represented by bits that configure the 5GS network function support information element indicating capability of the network in 5G. Further, the 13th identification information may be information that is selected and determined by the network, based on one or more pieces of the identification information out of the received 2nd identification information to 5th identification information, and/or the information associated with the DN, and/or the information associated with the NSI, and/or the capability information of the network, and/or the operator policy, and/or the state of the network, and/or the registration information of the user, and the like. Further, the 13th identification information may be information that is selected and determined based on another piece of the identification information that is selected by the network in the present procedure.

The 14th identification information is information indicating whether or not the network supports the second type of the redundant communication. The 14th identification information may be information represented by bits that configure the 5GS network function support information element indicating capability of the network in 5G. Further, the 14th identification information may be information that is selected and determined by the network, based on one or more pieces of the identification information out of the received 2nd identification information to 5th identification information, and/or the information associated with the DN, and/or the information associated with the NSI, and/or the capability information of the network, and/or the operator policy, and/or the state of the network, and/or the registration information of the user, and the like. Further, the 14th identification information may be information that is selected and determined based on another piece of the identification information that is selected by the network in the present procedure.

The 15th identification information is information indicating whether or not the network supports the third type of the redundant communication. The 15th identification information may be information represented by bits that configure the 5GS network function support information element indicating capability of the network in 5G. Further, the 15th identification information may be information that is selected and determined by the network, based on one or more pieces of the identification information out of the received 2nd identification information to 5th identification information, and/or the information associated with the DN, and/or the information associated with the NSI, and/or the capability information of the network, and/or the operator policy, and/or the state of the network, and/or the registration information of the user, and the like. Further, the 15th identification information may be information that is selected and determined based on another piece of the identification information that is selected by the network in the present procedure.

The 16th identification information is information indicating whether or not the network supports the IP address preservation. The 16th identification information may be information represented by bits that configure the 5GS network function support information element indicating capability of the network in 5G. Further, the 16th identification information may be information that is selected and determined by the network, based on the received 6th identification information, and/or the information associated with the DN, and/or the information associated with the NSI, and/or the capability information of the network, and/or the operator policy, and/or the state of the network, and/or the registration information of the user, and the like. Further, the 16th identification information may be information that is selected and determined based on another piece of the identification information that is selected by the network in the present procedure.

The 17th identification information is the LADN information. The 17th identification information may be the LADN information allowed by the network, and may be valid LADN information. Further, the 17th identification information may be information transmitted and/or received in a case that the LADN service area is present in a registration area to which the UE is connected.

Further, the 17th identification information may be information that is selected and determined by the network, based on one or more pieces of the identification information out of the received 1st identification information to 6th identification information, and/or the information associated with the DN, and/or the capability information of the network, and/or the operator policy, and/or the state of the network, and/or the registration information of the user, and the like. Further, the 17th identification information may be information that is selected and determined based on another piece of the identification information that is selected by the network in the present procedure.

Further, the LADN DNN included in the 17th identification information may be information for identifying the DN that supports the URLLC, may be information for identifying the DN that supports the redundant communication, or may be information for identifying the DN that supports the IP address preservation. To be more specific, the LADN DNN included in the 17th identification information may be information for identifying the DN that supports the first type of the redundant communication, may be information for identifying the DN that supports the second type of the redundant communication, or may be information for identifying the DN that supports the third type of the redundant communication.

The 21st identification information is information indicating whether or not the URLLC is supported in the PDU session established in the present procedure. The 21st identification information may be information indicating a request for establishment of the PDU session that supports the URLLC. Further, the 21st identification information may be information that is selected and determined based on one or more pieces of the identification information out of the transmitted and/or received 11th identification information to 17th identification information, and/or the configuration of the UE, and/or the state of the UE, and/or the user policy, and/or the request for the application. Further, the 21st identification information may be information including one or multiple meanings indicated by one or more pieces of the identification information out of the 22nd identification information to the 24th identification information. In other words, the 21st identification information may be information including one or more pieces of the identification information out of the 22nd identification information to the 24th identification information. Further, the 22nd identification information to the 24th identification information may be transmitted and/or received as separate pieces of identification information, or may be transmitted and/or received as a single piece of identification information.

The 22nd identification information is information indicating whether or not the redundant communication is supported in the PDU session established in the present procedure. The 22nd identification information may be information indicating a request for establishment of the PDU session that supports the redundant communication. Further, the 22nd identification information may be information that is selected and determined based on one or more pieces of the identification information out of the transmitted and/or received 11th identification information to 17th identification information, and/or the configuration of the UE, and/or the state of the UE, and/or the user policy, and/or the request for the application.

The 23rd identification information is information indicating a type of the redundant communication. The 23rd identification information may be information indicating a type of the redundant communication requested by the UE. To be more specific, the 23rd identification information may be information indicating a type of the redundant communication that is associated with the PDU session established in the present procedure, which is requested by the UE. Note that the 23rd identification information may be information indicating the first type of the redundant communication, may be information indicating the second type of the redundant communication, or may be information indicating the third type of the redundant communication. Further, the 22nd identification information may be information that is selected and determined based on one or more pieces of the identification information out of the transmitted and/or received 11th identification information to 17th identification information, and/or the configuration of the UE, and/or the state of the UE, and/or the user policy, and/or the request for the application.

The 24th identification information is information indicating whether or not the IP address preservation is supported in the PDU session established in the present procedure. The 24th identification information may be information indicating a request for establishment of the PDU session that supports the IP address preservation. Further, the 24th identification information may be information that is selected and determined based on one or more pieces of the identification information out of the transmitted and/or received 11th identification information to 17th identification information, and/or the configuration of the UE, and/or the state of the UE, and/or the user policy, and/or the request for the application.

The 25th identification information is information indicating the SSC mode. The 25th identification information may be information indicating the SSC mode requested by the UE. To be more specific, the 25th identification information may be information indicating the SSC mode that is associated with the PDU session established in the present procedure, which is requested by the UE. Note that the 25th identification information may be information indicating the SSC mode 1, may be information indicating the SSC mode 2, or may be information indicating the SSC mode 3. Further, the 25th identification information may be information that is selected and determined based on one or more pieces of the identification information out of the transmitted and/or received 11th identification information to 17th identification information, and/or the configuration of the UE, and/or the state of the UE, and/or the user policy, and/or the request for the application.

Further, the 25th identification information may be information indicating the session and service continuity of a type that is different from the SSC mode 1, the SSC mode 2, and the SSC mode 3. For example, the 25th identification information may be information indicating the SSC mode 4.

The 26th identification information is information indicating the DNN. The 26th identification information may be information indicating the DNN requested by the UE. To be more specific, the 26th identification information may be information indicating the DNN that is associated with the PDU session established in the present procedure, which is requested by the UE. Further, the 26th identification information may be information that is selected and determined based on one or more pieces of the identification information out of the transmitted and/or received 11th identification information to 17th identification information, and/or the configuration of the UE, and/or the state of the UE, and/or the user policy, and/or the request for the application.

The 31st identification information is information indicating whether or not the URLLC is supported in the PDU session established in the present procedure. The 31st identification information may be information indicating that the PDU session that supports the URLLC is established. Further, the 31st identification information may be information indicating that the request for establishment of the PDU session that supports the URLLC has been accepted.

Further, the 31st identification information may be information that is selected and determined by the network, based on the received 21st identification information, and/or the information associated with the DN, and/or the information associated with the NSI, and/or the capability information of the network, and/or the operator policy, and/or the state of the network, and/or the registration information of the user, and the like. Further, the 31st identification information may be information that is selected and determined based on another piece of the identification information that is selected by the network in the present procedure. Further, the 31st identification information may be information including one or multiple meanings indicated by one or more pieces of the identification information out of the 32nd identification information to the 34th identification information. In other words, the 31st identification information may be information including one or more pieces of the identification information out of the 32nd identification information to the 34th identification information. Further, the 32nd identification information to the 34th identification information may be transmitted and/or received as separate pieces of identification information, or may be transmitted and/or received as a single piece of identification information.

The 32nd identification information is information indicating whether or not the redundant communication is supported in the PDU session established in the present procedure. The 32nd identification information may be information indicating that the PDU session that supports the redundant communication is established. Further, the 32nd identification information may be information indicating that the request for establishment of the PDU session that supports the redundant communication has been accepted.

Further, the 32nd identification information may be information that is selected and determined by the network, based on the received 22nd identification information, and/or the received 23rd identification information, and/or the information associated with the DN, and/or the information associated with the NSI, and/or the capability information of the network, and/or the operator policy, and/or the state of the network, and/or the registration information of the user, and the like. Further, the 32nd identification information may be information that is selected and determined based on another piece of the identification information that is selected by the network in the present procedure.

The 33rd identification information is information indicating a type of the redundant communication. The 33rd identification information may be information indicating a type of the redundant communication that is selected by the network. To be more specific, the 33rd identification information may be information indicating a type of the redundant communication that is associated with the PDU session established in the present procedure, which is selected by the network. Note that the 33rd identification information may be information indicating the first type of the redundant communication, may be information indicating the second type of the redundant communication, or may be information indicating the third type of the redundant communication.

Further, the 33rd identification information may be information that is selected and determined by the network, based on the received 22nd identification information, and/or the received 23rd identification information, and/or the information associated with the DN, and/or the information associated with the NSI, and/or the capability information of the network, and/or the operator policy, and/or the state of the network, and/or the registration information of the user, and the like. Further, the 33rd identification information may be information that is selected and determined based on another piece of the identification information that is selected by the network in the present procedure.

The 34th identification information is information indicating whether or not the IP address preservation is supported in the PDU session established in the present procedure. The 34th identification information may be information indicating that the PDU session that supports the IP address preservation is established. Further, the 34th identification information may be information indicating that the request for establishment of the PDU session that supports the IP address preservation has been accepted.

Further, the 34th identification information may be information that is selected and determined by the network, based on the received 24th identification information, and/or the received 25th identification information, and/or the information associated with the DN, and/or the information associated with the NSI, and/or the capability information of the network, and/or the operator policy, and/or the state of the network, and/or the registration information of the user, and the like. Further, the 34th identification information may be information that is selected and determined based on another piece of the identification information that is selected by the network in the present procedure.

Further, the 35th identification information is information indicating the SSC mode. The 35th identification information may be information indicating the SSC mode that is selected by the network. To be more specific, the 35th identification information may be information indicating the SSC mode that is associated with the PDU session established in the present procedure, which is selected by the network. Note that the selected SSC mode may be the SSC mode 1, may be the SSC mode 2, or may be the SSC mode 3.

Further, the 35th identification information may be information that is selected and determined by the network, based on the received 24th identification information, and/or the received 25th identification information, and/or the information associated with the DN, and/or the information associated with the NSI, and/or the capability information of the network, and/or the operator policy, and/or the state of the network, and/or the registration information of the user, and the like. Further, the 35th identification information may be information that is selected and determined based on another piece of the identification information that is selected by the network in the present procedure.

Further, the 35th identification information may be information indicating the session and service continuity of a type that is different from the SSC mode 1, the SSC mode 2, and the SSC mode 3. For example, the 35th identification information may be information indicating the SSC mode 4.

Further, the 36th identification information is information indicating the DNN. The 36th identification information may be information indicating the DNN that is selected by the network. To be more specific, the 36th identification information may be information indicating the DNN that is associated with the PDU session established in the present procedure, which is selected by the network.

Further, the 36th identification information may be information that is selected and determined by the network, based on the received 36th identification information, and/or the information associated with the NSI, and/or the capability information of the network, and/or the operator policy, and/or the state of the network, and/or the registration information of the user, and the like. Further, the 36th identification information may be information that is selected and determined based on another piece of the identification information that is selected by the network in the present procedure.

3.2. Description of Procedures Used in Each Embodiment

Next, procedures used in each embodiment will be described. Note that the procedures used in each embodiment include a Registration procedure, a PDU session establishment procedure, and a UE configuration update procedure (Generic UE configuration update procedure). Each of the procedures will be described later.

Note that each embodiment will provide the description by taking an example of a case that, as illustrated in FIG. 2, each of the HSS and the UDM, the PCF and the PCRF, the SMF and the PGW-C, and the UPF and the PGW-U is configured as the same apparatus (in other words, the same physical hardware, the same logical hardware, or the same software). However, the details described in the present embodiment can also be applied to a case in which these are configured as different apparatuses (in other words, different pieces of physical hardware, different pieces of logical hardware, or different pieces of software). For example, between these, direct transmission and/or reception of data may be performed, data may be transmitted and/or received via the N26 interface between the AMF and the MME, and data may be transmitted and/or received via the UE.

3.2.1. Registration Procedure

First, the Registration procedure will be described with reference to FIG. 6. The registration procedure is a procedure in the 5GS. In the following, the present procedure refers to the registration procedure. The registration procedure is a procedure for the UE to initiate and be registered with the access network_B, and/or the core network_B, and/or the DN. In a state in which the UE is not registered with the network, for example, the UE can perform the present procedure at any timing such as in a case that the power is tuned on. In other words, the UE can initiate the present procedure at any timing in the deregistered state (RM-DEREGISTERED state). Further, each apparatus (in particular the UE and the AMF) can transition to the registered state (RM-REGISTERED state), based on completion of the registration procedure.

Further, the registration procedure may be a procedure for updating position registration information of the UE in the network, and/or notifying the network of the state of the UE from the UE on a regular basis, and/or updating a specific parameter related to the UE in the network.

The UE may initiate the registration procedure in a case that the UE carries out mobility across the TAs. In other words, the UE may initiate the registration procedure in a case that the UE moves to a TA that is different from the TAs indicated in the TA list being stored. Further, the UE may initiate the present procedure in a case that a running timer expires. Further, the UE may initiate the registration procedure in a case that update of the context of each apparatus is required because of disconnection and disenable of the PDU session. Further, the UE may initiate the registration procedure in a case that a change occurs in the capability information and/or the preference that is related to the PDU session establishment of the UE. Further, the UE may initiate the registration procedure on a regular basis. Further, the UE may initiate the registration procedure, based on completion of the UE configuration update procedure. Note that the UE can perform the registration procedure at any timing, other than the timings described above.

First, the UE transmits a Registration request message to the AMF via the 5G AN (or the gNB) (S800) (S802) (S804), and thereby initiates the registration procedure. Specifically, the UE transmits the RRC message including the registration request message to the 5G AN (or the gNB) (S800). Note that the registration request message is a NAS message. Further, the RRC message may be a control message that is transmitted and/or received between the UE and the 5G AN (or the gNB). Further, the NAS message is processed in the NAS layer, and the RRC message is processed in the RRC layer. Note that the NAS layer is a layer that is higher than the RRC layer.

Here, the UE can transmit one or more pieces of the identification information out of at least the 1st identification information to the 6th identification information included in the registration request message and/or the RRC message. However, the UE may transmit the one or more pieces of the identification information included in a control message different from these, such as a control message of a layer lower than the RRC layer (e.g., the MAC layer, the RLC layer, or the PDCP layer). Note that the UE may indicate that the UE supports each function or may indicate a request of the UE by transmitting these pieces of the identification information. Further, two or more pieces of the identification information out of these pieces of the identification information may be configured as one or more pieces of the identification information. Note that the information indicating support of each function and the information indicating the request for use of each function may be transmitted and/or received with the same piece of the identification information, or may be transmitted and/or received as different pieces of the identification information.

The UE may indicate that the UE supports the URLLC by transmitting the 1st identification information. In this case, the 1st identification information may be information indicating support of the URLLC.

Further, the UE may indicate that the UE supports the redundant communication by transmitting one or more pieces of the identification information out of the 2nd identification information to the 5th identification information. In this case, the 2nd identification information may be information indicating support of the redundant communication, and the 3rd identification information to the 5th identification information may be information indicating support of each of the types of the redundant communication.

Specifically, the UE may indicate that the UE supports the first type of the redundant communication by transmitting the 2nd identification information and/or the 3rd identification information. In this case, the 2nd identification information may be information indicating the first type of the redundant communication, and the 3rd identification information may be information indicating support of the first type of the redundant communication.

Further, the UE may indicate that the UE supports the second type of the redundant communication by transmitting the 2nd identification information and/or the 4th identification information. In this case, the 2nd identification information may be information indicating the second type of the redundant communication, and the 4th identification information may be information indicating support of the second type of the redundant communication.

Further, the UE may indicate that the UE supports the third type of the redundant communication by transmitting the 2nd identification information and/or the 5th identification information. In this case, the 2nd identification information may be information indicating the third type of the redundant communication, and the 5th identification information may be information indicating support of the third type of the redundant communication.

Further, the UE may indicate that the UE supports the IP address preservation by transmitting the 6th identification information. In this case, the 6th identification information may be information indicating support of the IP address preservation.

Further, the UE may initiate the PDU session establishment procedure during the registration procedure by transmitting the SM message (e.g., the PDU session establishment request message) included in the registration request message or by transmitting the SM message (e.g., the PDU session establishment request message) along with the registration request message.

In a case that the 5G AN (or the gNB) receives the RRC message including the registration request message, the 5G AN (or the gNB) selects the AMF to which the registration request message is forwarded (S802). Note that the 5G AN (or the gNB) can select the AMF, based on information included in the registration request message and/or the RRC message. The 5G AN (or the gNB) retrieves the registration request message from the received RRC messages and forwards the registration request message to the selected AMF (S804).

In a case that the AMF receives the registration request message, the AMF can perform the first condition determination. The first condition determination is intended to determine whether the network (or the AMF) accepts a request from the UE. The AMF initiates the procedure of (A) of FIG. 6 in a case that the first condition determination is true, whereas the AMF initiates the procedure of (B) of FIG. 6 in a case that the first condition determination is false.

Note that the first condition determination may be performed based on the reception of the registration request message, and/or each piece of the identification information included in the registration request message, and/or the subscriber information, and/or the capability information of the network, and/or the operator policy, and/or the state of the network, and/or the registration information of the user, and/or the context stored by the AMF, and the like. For example, the first condition determination may be true in a case that the network allows the request of the UE, and the first condition determination may be false in a case that the network does not allow the request of the UE. Furthermore, the first condition determination may be true in a case that the network of a destination of registration of the UE and/or an apparatus in the network supports a function requested by the UE, and the first condition determination may be false in a case that the network and/or the apparatus does not support the function requested by the UE. Further, the first condition determination may be true in a case that the transmitted and/or received identification information is allowed, and the first condition determination may be false in a case that the transmitted and/or received identification information is not allowed. Note that conditions for determining whether the first condition determination is true or false may not be limited to the above-described conditions.

First, a case that the first condition determination is true will be described. In the procedure of (A) of FIG. 6, first, the AMF can perform the fourth condition determination. The fourth condition determination is intended to determine whether the AMF transmits and/or receives the SM message to and/or from the SMF.

Note that the fourth condition determination may be performed based on whether or not the AMF has received the SM message. Further, the fourth condition determination may be performed based on whether the SM message is included in the registration request message. For example, the fourth condition determination may be true in a case that the AMF has received the SM message and/or in a case that the SM message is included in the registration request message, and the fourth condition determination may be false in a case that the AMF has not received the SM message and/or in a case that the SM message is not included in the registration request message. Note that conditions for determining whether the fourth condition determination is true or false may not be limited to the above-described conditions.

In a case that the fourth condition determination is true, the AMF selects the SMF and transmits and/or receives the SM message to and/or from the selected SMF, whereas in a case that the fourth condition determination is false, the AMF skips such processes (S806). Further, even in a case that the fourth condition determination is true, the AMF may suspend the procedure of (A) of FIG. 6 in a case that the AMF receives the SM message indicating rejection from the SMF. In this case, the AMF can initiate the procedure of (B) of FIG. 6.

Note that, in a case that the AMF performs transmission and/or reception of the SM message to and/or from the SMF in S806, the AMF can notify the SMF of the identification information received in the registration request message. The SMF can acquire the identification information received from the AMF by transmitting and/or receiving the SM message to and/or from the AMF.

Next, the AMF transmits the Registration accept message to the UE via the 5G AN (or the gNB) as a response message to the registration request message, based on the reception of the registration request message and/or the completion of the transmission and/or reception of the SM message to and/or from the SMF (S808). For example, in a case that the fourth condition determination is true, the AMF may transmit a registration accept message, based on the reception of the registration request message from the UE. Further, in a case that the fourth condition determination is false, the AMF may transmit a registration accept message, based on the completion of the transmission and/or reception of the SM message to and/or from the SMF. Note that although the registration accept message is a NAS message to be transmitted and/or received on the N1 interface, the registration accept message is transmitted and/or received by being included in the RRC message between the UE and the 5G AN (gNB).

The AMF may transmit one or more pieces of the identification information out of at least the 11th identification information to the 17th identification information included in the registration accept message. Note that the AMF may indicate that the network supports each function or may indicate that the request of the UE has been accepted by transmitting these pieces of the identification information. Further, two or more pieces of the identification information out of these pieces of the identification information may be configured as one or more pieces of the identification information. Note that the information indicating support of each function and the information indicating the request for use of each function may be transmitted and/or received with the same piece of the identification information, or may be transmitted and/or received as different pieces of the identification information.

The AMF may indicate that the network supports the URLLC by transmitting the 11th identification information. In this case, the 11th identification information may be information indicating support of the URLLC.

Further, the AMF may indicate that the network supports the redundant communication or may indicate which type of the redundant communication supports the support by transmitting one or more pieces of the identification information out of the 12th identification information to the 15th identification information. In this case, the 12th identification information may be information indicating support of the redundant communication, and the 13th identification information to the 15th identification information may be information indicating support of each of the types of the redundant communication.

Specifically, the AMF may indicate that the network supports the first type of the redundant communication by transmitting the 12th identification information and/or the 13th identification information. In this case, the 12th identification information may be information indicating the first type of the redundant communication, and the 13th identification information may be information indicating support of the first type of the redundant communication.

Further, the A M F may indicate that the network supports the second type of the redundant communication by transmitting the 12th identification information and/or the 14th identification information. In this case, the 12th identification information may be information indicating the second type of the redundant communication, and the 14th identification information may be information indicating support of the second type of the redundant communication.

Further, the AMF may indicate that the network supports the third type of the redundant communication by transmitting the 12th identification information and/or the 15th identification information. In this case, the 12th identification information may be information indicating the third type of the redundant communication, and the 15th identification information may be information indicating support of the third type of the redundant communication.

Further, the AMF may indicate that the network supports the IP address preservation by transmitting the 16th identification information. In this case, the 16th identification information may be information indicating support of the IP address preservation.

Further, the AMF may indicate that the network supports the LADN or may indicate that the network allows connection to the LADN by transmitting the 17th identification information. Further, the AMF may notify the UE of a list of the DNNs available in connection to the LADN and/or an area in which connection to the LADN is enabled by transmitting the 17th identification information.

Further, the AMF may indicate that the LADN DNN included in the 17th identification information is available in a case that the PDU session that supports the URLLC is established by transmitting the 11th identification information along with the 17th identification information. Further, the AMF may indicate that the LADN DNN included in the 17th identification information is available in a case that the PDU session that supports the redundant communication is established by transmitting one or more pieces of the identification information out of the 12th identification information to the 15th identification information along with the 17th identification information.

To be more specific, the AMF may indicate that the LADN DNN included in the 17th identification information is available in a case that the PDU session that supports the first type of the redundant communication is established by transmitting the 12th identification information and/or the 13th identification information along with the 17th identification information. Further, the AMF may indicate that the LADN DNN included in the 17th identification information is available in a case that the PDU session that supports the second type of the redundant communication is established by transmitting the 12th identification information and/or the 14th identification information along with the 17th identification information. Further, the AMF may indicate that the LADN DNN included in the 17th identification information is available in a case that the PDU session that supports the third type of the redundant communication is established by transmitting the 12th identification information and/or the 15th identification information along with the 17th identification information.

Further, the AMF may indicate that the LADN DNN included in the 17th identification information is available in a case that the PDU session that supports the IP address preservation is established by transmitting the 16th identification information along with the 17th identification information.

Note that the AMF may select and determine which piece of the identification information out of the 11th identification information to the 17th identification information is included in the registration accept message, based on each piece of the received identification information, and/or the subscriber information, and/or the capability information of the network, and/or the operator policy, and/or the state of the network, and/or the registration information of the user, and/or the context stored by the AMF, and the like.

Further, the AMF can transmit the SM message (e.g., the PDU session establishment accept message) included in the registration accept message, or can transmit the SM message (e.g., the PDU session establishment accept message) along with the registration accept message. Note that this transmission method may be performed in a case that the SM message (e.g., the PDU session establishment request message) is included in the registration request message and the fourth condition determination is true. Furthermore, the transmission method may be performed in a case that the registration request message and the SM message (e.g., the PDU session establishment request message) are included and the fourth condition determination is true. The AMF can indicate that the procedure for SM has been accepted in the registration procedure by performing such a transmission method.

Further, the AMF may indicate that the request of the UE has been accepted by transmitting the registration accept message, based on each piece of the received identification information, and/or the subscriber information, and/or the capability information of the network, and/or the operator policy, and/or the state of the network, and/or the registration information of the user, and/or the context stored by the AMF, and the like.

Further, the AMF may transmit information indicating that a part of the requests of the UE has been rejected included in the registration accept message, or may indicate the cause why the part of the requests of the UE has been rejected by transmitting the information indicating that the part of the requests of the UE has been rejected. Further, the UE may recognize the cause why the part of the requests of the UE has been rejected by receiving the information indicating that the part of the requests of the UE has been rejected. Note that the cause for the rejection may be information indicating that the details indicated by the identification information received by the AMF are not allowed.

The UE receives the registration accept message via the 5G AN (gNB)(S808). The UE can recognize the fact that the request of the UE made using the registration request message has been accepted and the details of various pieces of the identification information included in the registration accept message by receiving the registration accept message.

The UE can further transmit a registration complete message to the AMF via the 5G AN (gNB) as a response message to the registration accept message (S810). Note that, in a case that the UE has received an SM message such as a PDU session establishment accept message, the UE may transmit the SM message such as the PDU session establishment complete message included in the registration complete message, or may include the SM message therein to indicate that the procedure for SM is completed. Here, although the registration complete message is a NAS message to be transmitted and/or received on the N1 interface, the registration complete message is transmitted and/or received by being included in the RRC message between the UE and the 5G AN (gNB).

The AMF receives the registration complete message via the 5G AN (gNB) (S810). In addition, each apparatus completes the procedure of (A) of FIG. 6 based on the transmission and/or reception of the registration accept message and/or the registration complete message.

Next, a case that the first condition determination is false will be described. In the procedure of (B) of FIG. 6, the AMF transmits a Registration reject message to the UE via the 5G AN (gNB) as a response message to the registration request message (S812). Here, although the registration reject message is a NAS message to be transmitted and/or received on the N1 interface, the registration reject message is transmitted and/or received by being included in the RRC message between the UE and the 5G AN (gNB).

Note that the AMF may indicate that the request of the UE made using the registration request message has been rejected by transmitting the registration reject message. Further, the AMF may transmit information indicating the cause for the rejection included in the registration reject message, or may indicate the cause for the rejection by transmitting the cause for the rejection. Further, the UE may recognize the cause why the request of the UE has been rejected by receiving the information indicating the cause why the request of the UE has been rejected. Note that the cause for the rejection may be information indicating that the details indicated by the identification information received by the AMF are not allowed.

The UE receives the registration reject message via the 5G AN (gNB) (S812). The UE can recognize the fact that the request of the UE made using the registration request message has been rejected and the details of various pieces of the identification information included in the registration reject message by receiving the registration reject message. Further, in a case that the UE does not receive the registration reject message even after a prescribed period has passed after transmitting the registration request message, the UE may recognize that the request of the UE has been rejected. Each apparatus completes the procedure of (B) in the present procedure based on the transmission and/or reception of the registration reject message.

Figure 6:
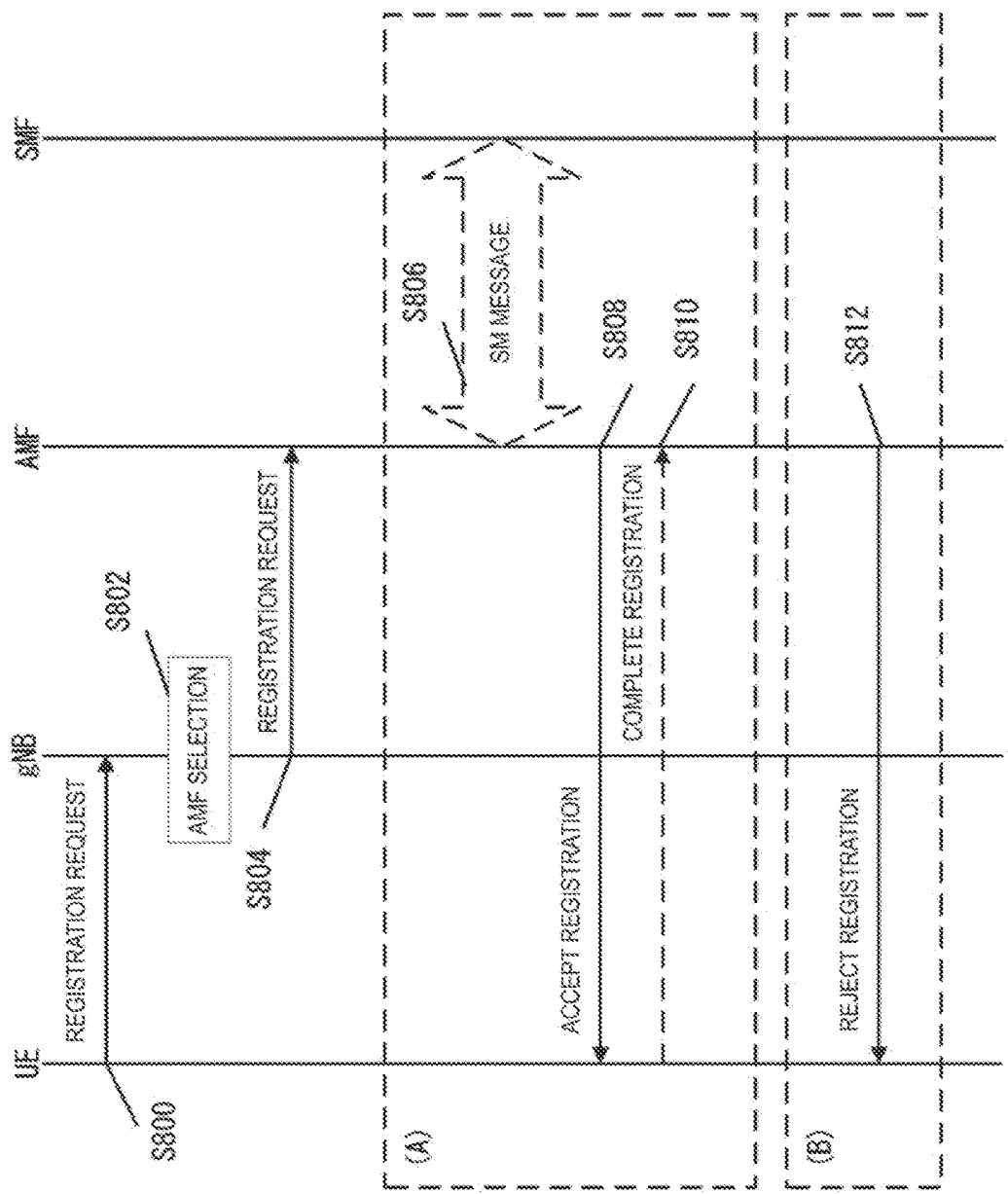
FIG. 6 is a diagram illustrating a registration procedure.

Note that the procedure of (B) of FIG. 6 may be initiated in a case that the procedure of (A) of FIG. 6 is suspended. In the procedure of (A) of FIG. 6, in a case that the fourth condition determination is true, the AMF may transmit the SM message indicating rejection, such as the PDU session establishment reject message, included in the registration reject message, or may indicate that the procedure for the SM has been rejected by including the SM message indicating rejection. In that case, the UE may further receive the SM message indicating rejection, such as the PDU session establishment reject message, or may recognize that the procedure for the SM has been rejected.

Each apparatus completes the registration procedure, based on the completion of the procedure of (A) or (B) of FIG. 6. Note that each apparatus may transition to a state in which the UE is registered in the network (RM_REGISTERED state), based on the completion of the procedure of (A) of FIG. 6. Each apparatus may maintain a state in which the UE is not registered with the network (RM_DEREGISTERED state) or may transition to a state in which the UE is not registered with the network, based on the completion of the procedure of (B) of FIG. 6. Transition to each state of each apparatus may be performed based on completion of the registration procedure, or may be performed based on an establishment of a PDU session.

Furthermore, each apparatus may perform processing based on information transmitted and/or received in the registration procedure, based on completion of the registration procedure. For example, in a case that the UE transmits and/or receives information indicating that a part of the requests of the UE has been rejected, the UE may recognize the cause why the request of the UE has been rejected. In addition, each apparatus may perform the present procedure again or may perform the registration procedure for the core network_B or another cell, based on the cause why the request of the UE has been rejected.

Further, the UE may store the identification information received along with the registration accept message and/or the registration reject message or may recognize determination of the network, based on the completion of the registration procedure.

For example, in a case that the UE receives the 11th identification information, the UE may recognize whether or not the network supports the URLLC. Further, in a case that the UE transmits the 1st identification information and/or receives the 11th identification information, the UE may recognize that establishment of the PDU session that supports the URLLC is enabled, or may initiate the PDU session establishment procedure for establishing the PDU session that supports the URLLC after the completion of the present procedure. In this case, the 1st identification information and the 11th identification information may be information indicating support of the URLLC.

Further, in a case that the UE receives one or more pieces of the identification information out of the 12th identification information to the 15th identification information, the UE may recognize whether or not the network supports the redundant communication, or may recognize which type of the redundant communication is supported. Further, in a case that the UE transmits one or more pieces of the identification information out of the 2nd identification information to the 5th identification information and/or in a case that the UE receives one or more pieces of the identification information out of the 12th identification information to the 15th identification information, the UE may recognize that establishment of the PDU session that supports the redundant communication is enabled, or may initiate the PDU session establishment procedure for establishing the PDU session that supports the redundant communication after the completion of the present procedure. In this case, the 2nd identification information and the 12th identification information may be information indicating support of the redundant communication, and the 3rd identification information to the 5th identification information and the 13th identification information to the 15th identification information may be information indicating support of each of the types of the redundant communication.

Specifically, in a case that the UE transmits the 2nd identification information and/or the 3rd identification information and/or in a case that the UE receives the 12th identification information and/or the 13th identification information, the UE may recognize that establishment of the PDU session that supports the first type of the redundant communication is enabled, or may initiate the PDU session establishment procedure for establishing the PDU session that supports the first type of the redundant communication after the completion of the present procedure. In this case, the 2nd identification information and the 12th identification information may be information indicating support of the first type of the redundant communication, and the 3rd identification information and the 13th identification information may be information indicating support of the first type of the redundant communication.

Further, in a case that the UE transmits the 2nd identification information and/or the 4th identification information and/or in a case that the UE receives the 12th identification information and/or the 14th identification information, the UE may recognize that establishment of the PDU session that supports the second type of the redundant communication is enabled, or may initiate the PDU session establishment procedure for establishing the PDU session that supports the second type of the redundant communication after the completion of the present procedure. In this case, the 2nd identification information and the 12th identification information may be information indicating support of the second type of the redundant communication, and the 4th identification information and the 14th identification information may be information indicating support of the second type of the redundant communication.

Further, in a case that the UE transmits the 2nd identification information and/or the 5th identification information and/or in a case that the UE receives the 12th identification information and/or the 15th identification information, the UE may recognize that establishment of the PDU session that supports the third type of the redundant communication is enabled, or may initiate the PDU session establishment procedure for establishing the PDU session that supports the third type of the redundant communication after the completion of the present procedure. In this case, the 2nd identification information and the 12th identification information may be information indicating support of the third type of the redundant communication, and the 5th identification information and the 15th identification information may be information indicating support of the third type of the redundant communication.

Further, in a case that the UE receives the 16th identification information, the UE may recognize whether or not the network supports the IP address preservation. Further, in a case that the UE transmits the 6th identification information and/or in a case that the UE receives the 16th identification information, the UE recognizes that establishment of the PDU session that supports the IP address preservation is enabled, or may initiate the PDU session establishment procedure for establishing the PDU session that supports the IP address preservation after the completion of the present procedure. In this case, the 6th identification information and the 16th identification information may be information indicating support of the IP address preservation.

Further, in a case that the UE receives the 17th identification information, the UE may recognize that the network supports the LADN, or may recognize that connection to the LADN is allowed. Further, in a case that the UE receives the 17th identification information, the UE may recognize that establishment of the PDU session for the LADN is enabled, or may initiate the PDU session establishment procedure for establishing the PDU session for the LADN after the completion of the present procedure. Further, in a case that the UE receives the 17th identification information, the UE may recognize a list of the DNNs available in connection to the LADN and/or an area in which connection to the LADN is enabled, or may store the list and/or the area in the context.

Further, in a case that the UE receives the 11th identification information along with the 17th identification information, the UE may recognize that the LADN DNN included in the 17th identification information is available in a case that the PDU session that supports the URLLC is established. Further, in a case that the UE receives one or more pieces of the identification information out of the 12th identification information to the 15th identification information along with the 17th identification information, the UE may recognize that the LADN DNN included in the 17th identification information is available in a case that the PDU session that supports the redundant communication is established.

To be more specific, in a case that the UE receives the 12th identification information and/or the 13th identification information along with the 17th identification information, the UE may recognize that the LADN DNN included in the 17th identification information is available in a case that the PDU session that supports the first type of the redundant communication is established. Further, in a case that the UE receives the 12th identification information and/or the 14th identification information along with the 17th identification information, the UE may recognize that the LADN DNN included in the 17th identification information is available in a case that the PDU session that supports the second type of the redundant communication is established. Further, in a case that the UE receives the 12th identification information and/or the 15th identification information along with the 17th identification information, the UE may recognize that the LADN DNN included in the 17th identification information is available in a case that the PDU session that supports the third type of the redundant communication is established.

Further, in a case that the UE receives the 16th identification information along with the 17th identification information, the UE may recognize that the LADN DNN included in the 17th identification information is available in a case that that the PDU session that supports the IP address preservation is established.

3.2.2. PDU Session Establishment Procedure

Next, an overview of the PDU session establishment procedure performed to establish a PDU session with the DN will be described with reference to FIG. 7. The PDU session establishment procedure is a procedure in the 5GS. As follows, the present procedure refers to a PDU session establishment procedure. The PDU session establishment procedure is a procedure for each apparatus to establish the PDU session. Note that each apparatus can initiate the PDU session establishment procedure at any timing that the registration procedure has completed and the state has entered the registered state. In addition, each apparatus may be able to perform the PDU session establishment procedure in the registration procedure. Each apparatus may establish the PDU session, based on completion of the PDU session establishment procedure. Note that the PDU session establishment procedure may be a procedure that is initiated by the UE initiating the procedure, or may be a procedure that is initiated by the UE making a request. Each apparatus can establish multiple PDU sessions by performing the PDU session establishment procedure multiple times.

Further, the UE may initiate the PDU session establishment procedure, based on the identification information received in the registration procedure. For example, in a case that the URLLC is supported, the UE may initiate the PDU session establishment procedure in order to establish the PDU session that supports the URLLC. Further, in a case that the redundant communication is supported, the UE may initiate the PDU session establishment procedure in order to establish the PDU session that supports the redundant communication. Further, in a case that the IP address preservation is supported, the UE may initiate the PDU session establishment procedure in order to establish the PDU session that supports the IP address preservation.

Further, in a case that the UE is located in an area in which connection to the LADN is enabled and/or in a case that the UE is located in the LADN service area, the UE may initiate the PDU session establishment procedure in order to establish the PDU session for the LADN. In other words, in a case that the UE is located outside of the LADN service area, the UE may be inhibited from performing the PDU session establishment procedure for establishing the PDU session for the LADN.

First, the UE transmits the NAS message including the PDU session establishment request message to the SMF via the 5G AN (gNB) and the AMF (S900) (S902) (S904), and thereby initiates the PDU session establishment procedure.

Specifically, the UE transmits the NAS message including the PDU session establishment request message to the AMF via the 5G AN (gNB) via the N1 interface (S900).

Here, the UE can transmit one or more pieces of the identification information out of at least the 21st identification information to the 26th identification information included in the PDU session establishment request message and/or the NAS message. However, the UE may transmit the one or more pieces of the identification information included in a control message different from these, such as a control message of a layer lower than the RRC layer (e.g., the MAC layer, the RLC layer, or the PDCP layer). These pieces of the identification information may indicate the request of the UE by being included in these messages. Further, two or more pieces of the identification information out of these pieces of the identification information may be configured as one or more pieces of the identification information.

The UE may indicate the request for establishment of the PDU session that supports the URLLC by transmitting the 21st identification information. In this case, the 21st identification information may be information indicating support of the URLLC.

Further, the UE may indicate the request for establishment of the PDU session that supports the redundant communication by transmitting the 22nd identification information and/or the 23rd identification information. Further, the UE may indicate the type of the redundant communication requested by the UE by transmitting the 22nd identification information and/or the 23rd identification information. In this case, the 22nd identification information may be information indicating support of the redundant communication. Further, the 23rd identification information may be information indicating the first type of the redundant communication, may be information indicating the second type of the redundant communication, or may be information indicating the third type of the redundant communication.

Specifically, the UE may indicate the request for establishment of the PDU session that supports the first type of the redundant communication by transmitting the 22nd identification information and/or the 23rd identification information. In this case, the 23rd identification information may be information indicating the first type of the redundant communication.

Further, the UE may indicate the request for establishment of the PDU session that supports the second type of the redundant communication by transmitting the 22nd identification information and/or the 23rd identification information. In this case, the 23rd identification information may be information indicating the second type of the redundant communication.

Further, the UE may indicate the request for establishment of the PDU session that supports the third type of the redundant communication by transmitting the 22nd identification information and/or the 23rd identification information. In this case, the 23rd identification information may be information indicating the third type of the redundant communication.

The UE may indicate the request for establishment of the PDU session that supports the 1P address preservation by transmitting the 24th identification information. In this case, the 24th identification information may be information indicating support of the IP address preservation.

Further, the UE may indicate the request for establishment of the PDU session of the SSC mode indicated by the 25th identification information or may indicate the SSC mode requested by the UE by transmitting the 25th identification information. In this case, the information SSC mode indicated by the 25th identification information may be any one of the "SSC mode 1", the "SSC mode 2", and the "SSC mode 3".

Further, the UE may indicate the request for establishment of the PDU session in which the IP address is preserved also in a case that the anchor point change procedure of the PDU session of the SSC mode 2 is performed by transmitting the 25th identification information along with the 24th identification information. In this case, the 24th identification information may be information indicating support of the IP address preservation, and the 25th identification information may be information indicating the SSC mode 2.

Further, the UE may indicate the request for establishment of the PDU session in which the IP address is preserved also in a case that the anchor point change procedure of the PDU session of the SSC mode 3 is performed by transmitting the 25th identification information along with the 24th identification information. In this case, the 24th identification information may be information indicating support of the IP address preservation, and the 25th identification information may be information indicating the SSC mode 3.

Further, the UE may indicate the request for establishment of the PDU session in which the IP address is preserved also in a case that the anchor point change procedure of the PDU session is performed by transmitting the 24th identification information and/or the 25th identification information. In this case, the 24th identification information may be information indicating support of the IP address preservation, and the 25th identification information may be information indicating the SSC mode 4. Note that, in a case that the 25th identification information is information indicating the SSC mode 4, the UE need not transmit the 24th identification information.

Further, the UE may indicate the request for establishment of the PDU session associated with the DNN indicated by the 26th identification information or may indicate the DNN requested by the UE by transmitting the 26th identification information. Note that the 26th identification information may be the DNN for identifying the DN that supports one or multiple functions indicated by the identification information that is transmitted and/or received along with the 26th identification information. Further, the 26th identification information may be the DNN that is received in the registration procedure, or may be the LADN.

In a case that the AMF receives the NAS message including the PDU session establishment request message (S900), the AMF retrieves the PDU session establishment request message from the NAS message, and selects the SMF as a transfer destination of the PDU session establishment request message (S902). Note that the AMF may select the SMF as the transfer destination, based on each piece of the identification information included in the PDU session establishment request message and/or the NAS message, and/or the subscriber information, and/or the capability information of the network, and/or the operator policy, and/or the state of the network, and/or the registration information of the user, and/or the context stored by the AMF, and the like.

The AMF transfers the PDU session establishment request message to the selected SMF via the N11 interface (S904).

In a case that the SMF receives the PDU session establishment request message (S904), the SMF recognizes various pieces of the identification information included in the PDU session establishment request message. Then, the SMF performs the third condition determination. The third condition determination is intended to determine whether the SMF accepts the request of the UE. In the third condition determination, the SMF determines whether the third condition determination is true or false. In a case that the third condition determination is true, the SMF initiates the procedure of (A) of FIG. 7, and in a case that the third condition determination is false, the SMF initiates the procedure of (B) of FIG. 7.

Note that the third condition determination may be performed based on each piece of the identification information included in the PDU session establishment request message and/or the PDU session establishment request message, and/or the subscriber information, and/or the capability information of the network, and/or the operator policy, and/or the state of the network, and/or the registration information of the user, and/or the context stored by the SMF, and the like. For example, the third condition determination may be true in a case that the network allows the request of the UE. In addition, the third condition determination may be false in a case that the network does not allow the request of the UE. Furthermore, in a case that the network as the connection destination of the UE and/or the apparatus in the network supports the function requested by the UE, the third condition determination may be true, and in a case that the network and/or the apparatus does not support the function requested by the UE, the third condition determination may be false. Further, in a case that the transmitted and/or received identification information is allowed, the third condition determination may be true, and in a case that the transmitted and/or received identification information is not allowed, the third condition determination may be false. Note that conditions for determining whether the third condition determination is true or false may not be limited to the above-described conditions.

As follows, steps in a case that the third condition determination is true, in other words, each step of the procedure of (A) of FIG. 7, will be described. The SMF selects the UPF as an establishment destination of the PDU session and transmits the session establishment request message to the selected UPF via the N4 interface (S906), and initiates the procedure of (A) of FIG. 7.

Here, the SMF may select one or more UPFs, based on each piece of the identification information acquired based on the reception of the PDU session establishment request message, and/or the subscriber information, and/or the capability information of the network, and/or the operator policy, and/or the state of the network, and/or the registration information of the user, and/or the context stored by the SMF, and the like. Note that in a case that multiple UPFs are selected, the SMF may transmit the session establishment request message to each of the UPFs.

The UPF receives the session establishment request message from the SMF via the N4 interface (S906), and creates a context for the PDU session. Further, the UPF transmits a session establishment response message to the SMF via the N4 interface, based on the reception of the session establishment request message and/or the creation of the context for the PDU session (S908).

The SMF receives the session establishment response message from the UPF via the N4 interface as a response message to the session establishment request message (S908). The SMF may perform address allocation of an address to be allocated to the UE based on the reception of the PDU session establishment request message and/or the selection of the UPF and/or the reception of the session establishment response message.

The SMF transmits the PDU session establishment accept message to the UE via the AMF, based on the reception of the PDU session establishment request message, and/or the selection of the UPF, and/or the reception of the session establishment response message, and/or the completion of the address allocation of the address to be allocated to the UE (S910) (S912).

Specifically, in a case that the SMF transmits the PDU session establishment accept message to the AMF via the N11 interface (S910), the AMF that has received the PDU session establishment request message transmits a NAS message including the PDU session establishment accept message to the UE via the N1 interface (S912). Note that the PDU session establishment accept message is a NAS message, and may be a response message to the PDU session establishment request. Further, the PDU session establishment accept message can indicate that the establishment of the PDU session has been accepted.

Here, the SMF and the AMF may indicate that the request of the UE made using the PDU session establishment request has been accepted by transmitting the PDU session establishment accept message.

The SMF and the AMF may transmit one or more pieces of the identification information out of at least the 31st identification information to the 36th identification information included in the PDU session establishment accept message. Note that the SMF and the AMF may indicate that the network supports each function or may indicate that the request of the UE has been accepted by transmitting these pieces of the identification information. Further, two or more pieces of the identification information out of these pieces of the identification information may be configured as one or more pieces of the identification information. Note that the information indicating support of each function and the information indicating the request for use of each function may be transmitted and/or received with the same piece of the identification information, or may be transmitted and/or received as different pieces of the identification information.

The SMF and the AMF may indicate acceptance of the request for establishment of the PDU session that supports the URLLC or may indicate that the PDU session is established by transmitting the 31st identification information. In this case, the 31st identification information may be information indicating support of the URLLC.

Further, the SMF and the AMF may indicate acceptance of the request for establishment of the PDU session that supports the redundant communication or may indicate that the PDU session is established by transmitting the 32nd identification information and/or the 33rd identification information. Further, the SMF and the AMF may indicate a type of the redundant communication that is selected and determined by the network by transmitting the 32nd identification information and/or the 33rd identification information. In this case, the 32nd identification information may be information indicating support of the redundant communication. Further, the 33rd identification information may be information indicating the first type of the redundant communication, may be information indicating the third type of the redundant communication, or may be information indicating the third type of the redundant communication.

Specifically, the SMF and the AMF may indicate acceptance of the request for establishment of the PDU session that supports the first type of the redundant communication or may indicate that the PDU session is established by transmitting the 32nd identification information and/or the 33rd identification information. In this case, the 33rd identification information may be information indicating the first type of the redundant communication.

Further, the SMF and the AMF may indicate acceptance of the request for establishment of the PDU session that supports the third type of the redundant communication or may indicate that the PDU session is established by transmitting the 32nd identification information and/or the 33rd identification information. In this case, the 33rd identification information may be information indicating the third type of the redundant communication.

Further, the SMF and the AMF may indicate acceptance of the request for establishment of the PDU session that supports the third type of the redundant communication or may indicate that the PDU session is established by transmitting the 32nd identification information and/or the 33rd identification information. In this case, the 33rd identification information may be information indicating the third type of the redundant communication.

The SMF and the AMF may indicate acceptance of the request for establishment of the PDU session that supports the IP address preservation or may indicate that the PDU session is established by transmitting the 34th identification information. In this case, the 34th identification information may be information indicating support of the IP address preservation.

Further, the SMF and the AMF may indicate acceptance of the request for establishment of the PDU session of the SSC mode indicated by the 35th identification information or may indicate that the PDU session is established by transmitting the 35th identification information. Further, the SMF and the AMF may indicate the SSC mode that is selected and determined by the network by transmitting the 35th identification information. In this case, the information SSC mode indicated by the 35th identification information may be any one of the "SSC mode 1", the "SSC mode 2", and the "SSC mode 3".

Further, the SMF and the AMF may indicate acceptance of the request for establishment of the PDU session in which the IP address is preserved or may indicate that the PDU session is established also in a case that the anchor point change procedure of the PDU session of the SSC mode 2 is performed by transmitting the 35th identification information along with the 34th identification information. In this case, the 34th identification information may be information indicating support of the IP address preservation, and the 35th identification information may be information indicating the SSC mode 2.

Further, the SMF and the AMF may indicate acceptance of the request for establishment of the PDU session in which the IP address is preserved or may indicate that the PDU session is established also in a case that the anchor point change procedure of the PDU session of the SSC mode 3 is performed by transmitting the 35th identification information along with the 34th identification information. In this case, the 34th identification information may be information indicating support of the IP address preservation, and the 35th identification information may be information indicating the SSC mode 3.

Further, the SMF and the AMF may indicate acceptance of the request for establishment of the PDU session in which the IP address is preserved or may indicate that the PDU session is established also in a case that the anchor point change procedure of the PDU session is performed by transmitting the 34th identification information and/or the 35th identification information. In this case, the 34th identification information may be information indicating support of the IP address preservation, and the 35th identification information may be information indicating the SSC mode 4. Note that, in a case that the 35th identification information is information indicating the SSC mode 4, the SMF and the AMF need not transmit the 34th identification information.

Further, the SMF and the AMF may indicate acceptance of the request for establishment of the PDU session that is associated with the DNN indicated by the 36th identification information or may indicate that the PDU session is established by transmitting the 36th identification information. Further, the SMF and the AMF may indicate transmission of the 36th identification information, and the DNN that is selected and determined by the network. Note that the 36th identification information may be the DNN for identifying the DN that supports one or multiple functions indicated by the identification information that is transmitted and/or received along with the 36th identification information. Further, the 36th identification information may be the DNN that is transmitted in the registration procedure, or may be the LADN.

Note that the SMF and the AMF may select and determine which piece of the identification information out of at least the 31st identification information to the 36th identification information is included in the PDU session establishment accept message, based on each piece of the received identification information, and/or the subscriber information, and/or the capability information of the network, and/or the operator policy, and/or the state of the network, and/or the registration information of the user, and/or the context stored by the AMF, and the like.

Further, the SMF and the AMF can include a selected and/or allowed PDU session ID in the PDU session establishment accept message. Further, the SMF and the AMF can specify the PDU session type indicating a selected and/or allowed type of the PDU session. As the PDU session type, as described above, any one of IPv4, IPv6, IP, Ethernet, and Unstructured can be specified. Further, the SMF and the AMF can include a selected and/or allowed SSC mode of the PDU session in the PDU session establishment accept message.

Further, the SMF and the AMF can include an approved QoS rule group in the PDU session establishment accept message. Note that one or multiple QoS rules may be included in the approved QoS rule group. Further, in the present procedure, in a case that multiple QoS flows and/or multiple user plane radio bearers are established, multiple QoS rules may be included in the approved QoS rule group. Conversely, in the present procedure, in a case that only a single QoS flow and/or a single user plane radio bearer is established, a single QoS rule may be included in the approved QoS rule group.

Further, the SMF may transmit the information indicating that a part of the requests of the UE has been rejected included in the PDU session establishment accept message, or may indicate that the cause why the part of the requests of the UE has been rejected by transmitting the information indicating that the part of the requests of the UE has been rejected. Further, the UE may recognize the cause why the part of the requests of the UE has been rejected by receiving the information indicating that the part of the requests of the UE has been rejected. Note that the cause for the rejection may be information indicating that the details indicated by the identification information received by the SMF are not allowed.

In a case that the UE receives the NAS message including the PDU session establishment accept message from the AMF via the N1 interface (S912), the UE transmits the PDU session establishment complete message to the SMF via the AMF (S914) (S916). The UE can detect that the request of the UE made using the PDU session establishment request has been accepted by receiving the PDU session establishment accept message.

Specifically, the UE transmits the PDU session establishment complete message to the AMF via the N1 interface (S914). In a case that the AMF receives the PDU session establishment complete message from the UE, the AMF transmits the PDU session establishment complete message to the SMF via the N11 interface (S916).

Note that the PDU session establishment complete message transmitted by the AMF to the SMF may be a response message to the PDU session establishment accept message transmitted from the SMF to the AMF in S910. Furthermore, the PDU session establishment complete message may be a NAS message. Furthermore, the PDU session establishment complete message only needs to be a message indicating that the PDU session establishment procedure has been completed.

In a case that the SMF receives the PDU session establishment complete message from the AMF via the N11 interface (S916), the SMF can perform the second condition determination. The second condition determination is to determine a type of the message on the N4 interface to be transmitted and/or received. In a case that the second condition determination is true, in a case that the SMF transmits the session modification request message to the UPF via the N4 interface (S918), the SMF receives the session modification accept message transmitted from the UPF as a response message to the session modification request message (S920). In a case that the second condition determination is false, in a case that the SMF transmits the session establishment request message to the UPF via the N4 interface (S918), the SMF receives the session modification accept message transmitted from the UPF as a response message to the session establishment request message (S920).

Note that the second condition determination may be performed based on whether the session on the N4 interface for the PDU session has been established. For example, in a case that the session on the N4 interface for the PDU session has been established, the second condition determination may be true, and in a case that the session on the N4 interface for the PDU session is not established, the second condition determination may be false. Note that conditions for determining true or false of the second condition determination need not be limited to the above-described conditions.

Each apparatus completes the procedure of (A) in the PDU session establishment procedure, based on the transmission and/or reception of the PDU session establishment complete message, and/or the transmission and/or reception of a session modification response message, and/or the transmission and/or reception of a session establishment response message. In a case that the procedure of (A) in the present procedure is completed, the UE is in a state in which the PDU session to the DN has been established.

Next, each step of the procedure of (B) in the PDU session establishment procedure will be described. The SMF transmits the PDU session establishment reject message to the UE via the AMF (S922) (S924). Specifically, the SMF transmits the PDU session establishment reject message to the AMF via the N11 interface (S922). In a case that the AMF receives the PDU session establishment request message from the SMF via the N11 interface (S922), the AMF transmits the PDU session establishment reject message to the UE using the N1 interface (S924).

Note that the PDU session establishment reject message may be a NAS message. Further, the PDU session establishment reject message only needs to be a message indicating that the PDU session establishment has been rejected.

Here, the SMF may indicate that the request of the UE made using the PDU session establishment request has been rejected by transmitting the PDU session establishment reject message. Further, the SMF may transmit information indicating the cause for the rejection included in the PDU session establishment reject message, or may indicate the cause for the rejection by transmitting the cause for the rejection. Further, the UE may recognize the cause why the request of the UE has been rejected by receiving the information indicating the cause why the request of the UE has been rejected. Note that the cause for the rejection may be information indicating that the details indicated by the identification information received by the SMF are not allowed.

The UE can recognize the fact that the request of the UE made using the PDU session establishment request has been rejected and the details of various pieces of the identification information included in the PDU session establishment reject message by receiving the PDU session establishment reject message.

Figure 7:
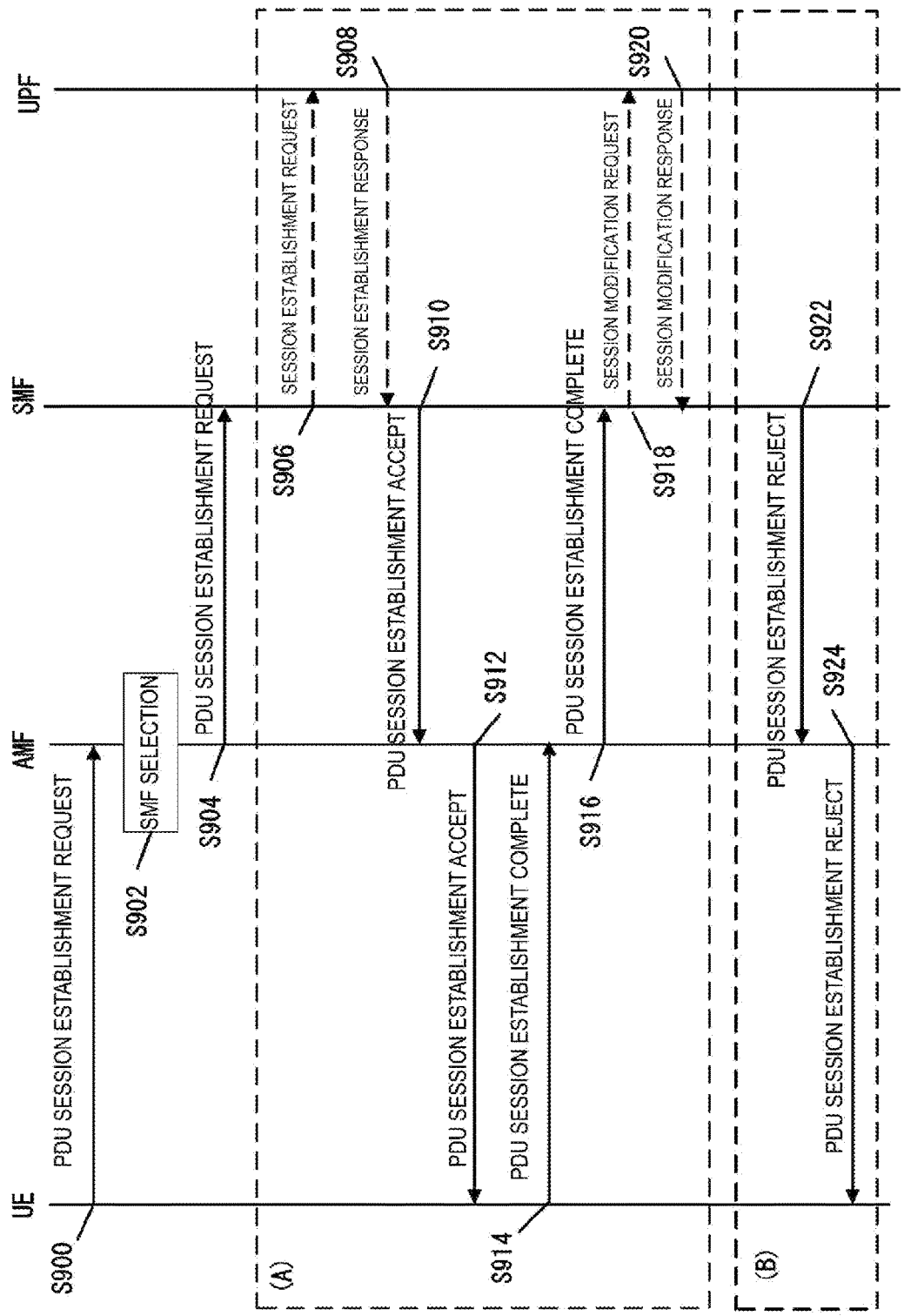
FIG. 7 is a diagram illustrating a PDU session establishment procedure.

Each apparatus completes the PDU session establishment procedure, based on completion of the procedure of (A) or (B) of FIG. 7. Note that each apparatus may transition to a state in which the PDU session is established, based on the completion of the procedure of (A) of FIG. 7. Each apparatus may recognize that the PDU session establishment procedure has been rejected, or may transition to a state in which the PDU session is not established, based on the completion of the procedure of (B) of FIG. 7. Further, the UE can communicate with the DN by using the established PDU session, based on completion of the procedure of (A) of FIG. 7.

Furthermore, each apparatus may perform processing based on information transmitted and/or received in the PDU session establishment procedure, based on completion of the PDU session establishment procedure. For example, in a case that each apparatus transmits and/or receives information indicating that a part of the requests of the UE has been rejected, each apparatus may recognize the cause why the request of the UE has been rejected. In addition, each apparatus may perform the present procedure again or may perform the PDU session establishment procedure for another cell, based on the cause why the request of the UE has been rejected.

Further, the UE may store the identification information received along with the PDU session establishment accept message and/or the PDU session establishment reject message or may recognize determination of the network, based on the completion of the PDU session establishment procedure.

For example, in a case that the UE receives the 31st identification information, the UE may recognize whether or not the URLLC is supported in the established PDU session. Further, in a case that each apparatus transmits and/or receives the 21st identification information and/or the 31st identification information, each apparatus may establish the PDU session that supports the URLLC. Further, in a case that the UE transmits the 21st identification information and/or receives the 31st identification information, the UE may recognize that the PDU session that supports the URLLC has been established. In this case, the 21st identification information and/or the 31st identification information may be information indicating support of the URLLC.

Further, in a case that the UE receives the 32nd identification information and/or the 33rd identification information, the UE may recognize whether or not the redundant communication is supported in the established PDU session. Further, in a case that each apparatus transmits and/or receives the 22nd identification information, and/or the 23rd identification information, and/or the 32nd identification information, and/or the 33rd identification information, each apparatus may establish the PDU session that supports the redundant communication. Further, in a case that the UE transmits the 22nd identification information and/or the 23rd identification information and/or in a case that the UE receives the 32nd identification information and/or the 33rd identification information, the UE may recognize that the PDU session that supports the redundant communication has been established. In this case, the 22nd identification information and the 32nd identification information may be information indicating support of the redundant communication. Further, the 23rd identification information and/or the 33rd identification information may be information indicating the first type of the redundant communication, may be information indicating the third type of the redundant communication, or may be information indicating the third type of the redundant communication.

Specifically, in a case that each apparatus transmits and/or receives the 22nd identification information, and/or the 23rd identification information, and/or the 32nd identification information, and/or the 33rd identification information, each apparatus may establish the PDU session that supports the first type of the redundant communication. Further, in a case that the UE transmits the 22nd identification information and/or the 23rd identification information and/or in a case that the UE receives the 32nd identification information and/or the 33rd identification information, the UE may recognize that the PDU session that supports the first type of the redundant communication is established. In this case, the 33rd identification information may be information indicating the first type of the redundant communication.

Further, in a case that each apparatus transmits and/or receives the 22nd identification information, and/or the 23rd identification information, and/or the 32nd identification information, and/or the 33rd identification information, each apparatus may establish the PDU session that supports the second type of the redundant communication. Further, in a case that the UE transmits the 22nd identification information and/or the 23rd identification information and/or in a case that the UE receives the 32nd identification information and/or the 33rd identification information, the UE may recognize that the PDU session that supports the second type of the redundant communication is established. In this case, the 33rd identification information may be information indicating the second type of the redundant communication.

Further, in a case that each apparatus transmits and/or receives the 22nd identification information, and/or the 23rd identification information, and/or the 32nd identification information, and/or the 33rd identification information, each apparatus may establish the PDU session that supports the third type of the redundant communication. Further, in a case that the UE transmits the 22nd identification information and/or the 23rd identification information and/or in a case that the UE receives the 32nd identification information and/or the 33rd identification information, the UE may recognize that the PDU session that supports the third type of the redundant communication is established. In this case, the 33rd identification information may be information indicating the third type of the redundant communication.

In a case that the UE receives the 34th identification information, the UE may recognize whether or not the IP address preservation is supported in the established PDU session. Further, in a case that each apparatus transmits and/or receives the 24th identification information and/or the 34th identification information, each apparatus may establish the PDU session that supports the IP address preservation. Further, in a case that the UE transmits the 24th identification information and/or in a case that the UE receives the 34th identification information, the UE may recognize that the PDU session that supports the IP address preservation has been established. In this case, the 24th identification information and/or the 34th identification information may be information indicating support of the IP address preservation.

Further, in a case that the UE receives the 35th identification information, the UE may recognize that the PDU session of the SSC mode indicated by the 35th identification information is established, or may recognize the SSC mode that is associated with the PDU session to be established. Further, in a case that each apparatus transmits and/or receives the 35th identification information, each apparatus may establish the PDU session of the SSC mode indicated by the 35th identification information. Further, in a case that the UE receives the 35th identification information, the UE may store the SSC mode indicated by the 35th identification information in the context of the PDU session to be established. Further, in a case that the UE receives the 35th identification information, the UE may recognize that the request for establishment of the PDU session of the SSC mode indicated by the 25th identification information has been accepted. In this case, the information SSC mode indicated by the 35th identification information may be any one of the "SSC mode 1", the "SSC mode 2", and the "SSC mode 3".

Further, in a case that each apparatus transmits and/or receives the 35th identification information along with the 34th identification information, each apparatus may establish the PDU session in which the IP address is preserved also in a case that the anchor point change procedure of the PDU session of the SSC mode 2 is performed. Further, in a case that the UE receives the 35th identification information along with the 34th identification information, the UE may recognize that the PDU session in which the IP address is preserved is established also in a case that the anchor point change procedure of the PDU session of the SSC mode 2 is performed. In this case, the 34th identification information may be information indicating support of the IP address preservation, and the 35th identification information may be information indicating the SSC mode 2.

Further, in a case that each apparatus transmits and/or receives the 35th identification information along with the 34th identification information, each apparatus may establish the PDU session in which the IP address is preserved also in a case that the anchor point change procedure of the PDU session of the SSC mode 3 is performed. Further, in a case that the UE receives the 35th identification information along with the 34th identification information, the UE may recognize that the PDU session in which the IP address is preserved is established also in a case that the anchor point change procedure of the PDU session of the SSC mode 3 is performed. In this case, the 34th identification information may be information indicating support of the IP address preservation, and the 35th identification information may be information indicating the SSC mode 3.

Further, in a case that each apparatus transmits and/or receives the 34th identification information and/or the 35th identification information, each apparatus may establish the PDU session in which the IP address is preserved also in a case that the anchor point change procedure of the PDU session is performed. Further, in a case that the UE receives the 34th identification information and/or the 35th identification information, the UE may recognize that the PDU session in which the IP address is preserved is established also in a case that the anchor point change procedure of the PDU session is performed. In this case, the 34th identification information may be information indicating support of the IP address preservation, and the 35th identification information may be information indicating the SSC mode 4.

Note that, in a case that the 35th identification information is information indicating the SSC mode 4, the UE need not transmit the 34th identification information.

Further, in a case that each apparatus transmits and/or receives the 36th identification information, each apparatus may establish the PDU session that is associated with the DNN indicated by the 36th identification information. Further, in a case that the UE receives the 36th identification information, the UE may recognize that the PDU session that is associated with the DNN indicated by the 36th identification information is established. Further, in a case that the UE receives the 36th identification information, the UE may recognize the DNN that is selected and determined by the network. Note that the 36th identification information may be the DNN for identifying the DN that supports one or multiple functions indicated by the identification information that is transmitted and/or received along with the 36th identification information. Further, the 36th identification information may be the DNN that is received in the registration procedure, or may be the LADN.

4. First Embodiment

Next, a first embodiment will be described. The first embodiment is hereinafter referred to as the present embodiment. In the communication procedure according to the present embodiment, first, each apparatus performs the registration procedure initiated by the UE. Next, each apparatus establishes the PDU session by performing the PDU session establishment procedure initiated by the UE, and transitions to a state in which communication using the PDU session can be performed between the UE and the DN. Next, each apparatus performs transmission and/or reception of the user data by using the PDU session. The procedure according to the present embodiment is completed by the above procedure.

Note that, in the procedure according to the present embodiment, in the registration procedure, each apparatus may exchange support information of the URLLC, support information of the redundant communication, and/or support information of the IP address preservation between the UE and the network.

Further, based on the information exchanged in the registration procedure in the PDU session establishment procedure, each apparatus may establish the PDU session in which the URLLC is supported, may establish the PDU session in which the redundant communication is supported, or may establish the PDU session in which the IP address preservation is supported between the UE and the network. Note that the PDU session in which the URLLC is supported, the PDU session in which the redundant communication is supported, and the PDU session in which the IP address preservation is supported may be the PDU session that can only be established for a specific DN. Here, the specific DN may be the LADN, for example.

Further, by using the established PDU session, each apparatus may perform communication of the user data in which the URLLC is supported, may perform the redundant communication, or may perform communication of the user data in which the IP address preservation is supported.

5. Modified Examples

A program running on an apparatus according to the present invention may serve as a program that controls a Central Processing Unit (CPU) and the like to cause a computer to operate in such a manner as to realize the functions of the above-described embodiment according to the present invention. Programs or information handled by the programs are temporarily stored in a volatile memory such as a Random Access Memory (RAM), a non-volatile memory such as a flash memory, a Hard Disk Drive (HDD), or another storage device system.

Note that a program for realizing such functions of the embodiment according to the present invention may be recorded on a computer-readable recording medium. The functions may be realized by causing a computer system to read the program recorded on the recording medium for execution. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, a medium dynamically retaining the program for a short time, or any other computer readable recording medium.

Furthermore, each functional block or various characteristics of the apparatuses used in the above-described embodiment may be implemented or performed on an electric circuit, for example, an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor, or may be a processor of a known type, a controller, a micro-controller, or a state machine instead. The above-mentioned electric circuit may include a digital circuit, or may include an analog circuit. In a case that with advances in semiconductor technology, a circuit integration technology appears that replaces the present integrated circuits, one or multiple aspects of the present invention are also possible to use a new integrated circuit based on the technology.

Note that the invention of the present patent application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Various modifications are possible within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

The invention claimed is:

1. A User Equipment (UE) comprising:
a controller; and
transmission and/or reception circuitry, wherein
during a Protocol Data Unit (PDU) session establishment procedure, the transmission and/or reception circuitry is configured to receive, from a core network device, a PDU session establishment accept message,
the controller considers, in a case that the transmission and/or reception circuitry receives information indicating a type of a PDU session included in the PDU session establishment accept message, that an established PDU session is usable for Ultra-Reliable and Low Latency Communications (URLLC),
the controller considers, in a case that the transmission and/or reception circuitry does not receive information indicating the type of the PDU session included in the PDU session establishment accept message, whether the established PDU session is usable for the URLLC to be unknown, and
the established PDU session usable for the URLLC is associated with a Quality of Service (QoS) rule.

2. A core network device comprising:
a controller; and
transmission and/or reception circuitry, wherein
during a Protocol Data Unit (PDU) session establishment procedure, the transmission and/or reception circuitry is configured to transmit, to a User Equipment (UE), a PDU session establishment accept message,
the controller considers, in a case that the transmission and/or reception circuitry transmits information indicating a type of a PDU session included in the PDU session establishment accept message, that an established PDU session is usable for Ultra-Reliable and Low Latency Communications (URLLC),
the controller considers, in a case that the transmission and/or reception circuitry does not transmit information indicating the type of the PDU session included in the PDU session establishment accept message, whether the established PDU session is usable for the URLLC to be unknown, and
the established PDU session usable for the URLLC is associated with a Quality of Service (QoS) rule.

3. A communication control method performed by a User Equipment (UE), the communication control method comprising:
during a Protocol Data Unit (PDU) session establishment procedure, receiving, from a core network device, a PDU session establishment accept message;
considering, in a case of receiving information indicating a type of a PDU session included in the PDU session establishment accept message, that an established PDU session is usable for Ultra-Reliable and Low Latency Communications (URLLC); and
considering in a case of not receiving information indicating the type of the PDU session included in the PDU session establishment accept message, whether the established PDU session is usable for the URLLC to be unknown, wherein
the established PDU session usable for the URLLC is associated with a Quality of Service (QoS) rule.

4. A communication control method performed by a core network device, the communication control method comprising:
during a Protocol Data Unit (PDU) session establishment procedure, transmitting, to a User Equipment (UE), a PDU session establishment accept message;
considering, in a case of transmitting information indicating a type of a PDU session included in the PDU session establishment accept message, that an established PDU session is usable for Ultra-Reliable and Low Latency Communications (URLLC); and
considering, in a case of not transmitting information indicating the type of the PDU session included in the PDU session establishment accept message, whether the established PDU session is usable for the URLLC to be unknown, wherein
the established PDU session usable for the URLLC is associated with a Quality of Service (QoS) rule.

* * * * *